US012812668B2

(12) United States Patent
Yoshioka et al.

(10) Patent No.: US 12,812,668 B2
(45) Date of Patent: Nov. 24, 2026

(54) TERMINAL AND COMMUNICATION METHOD

(71) Applicant: NTT DOCOMO, INC., Tokyo (JP)

(72) Inventors: Shohei Yoshioka, Tokyo (JP); Naoya Shibaike, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 280 days.

(21) Appl. No.: 18/703,961

(22) PCT Filed: Nov. 5, 2021

(86) PCT No.: PCT/JP2021/040895
§ 371 (c)(1),
(2) Date: Apr. 23, 2024

(87) PCT Pub. No.: WO2023/079716
PCT Pub. Date: May 11, 2023

(65) Prior Publication Data
US 2024/0430916 A1 Dec. 26, 2024

(51) Int. Cl.

| | |
|---|---|
| ***H04W 72/40*** | (2023.01) |
| ***H04W 28/26*** | (2009.01) |
| ***H04W 72/02*** | (2009.01) |
| ***H04W 72/542*** | (2023.01) |

(52) U.S. Cl.
CPC ........... *H04W 72/40* (2023.01); *H04W 28/26* (2013.01); *H04W 72/02* (2013.01); *H04W 72/542* (2023.01)

(58) Field of Classification Search
CPC ..... H04W 72/40; H04W 28/26; H04W 72/02; H04W 72/542; H04W 92/18; H04W 4/42; Y02D 30/70
See application file for complete search history.

(56) References Cited

U.S. PATENT DOCUMENTS

| | | | | |
|---|---|---|---|---|
| 2022/0201528 A1* | 6/2022 | Shin | ........................ | H04L 5/005 |
| 2022/0295514 A1* | 9/2022 | Shin | .................. | H04W 52/0216 |
| 2024/0015702 A1* | 1/2024 | Ji | ...................... | H04W 72/0446 |
| 2024/0172184 A1* | 5/2024 | Lin | ....................... | H04W 72/02 |
| 2024/0196419 A1* | 6/2024 | Ye | ......................... | H04W 72/02 |

(Continued)

OTHER PUBLICATIONS

3GPP TS 38.211 V16.7.0; "3rd Generation Partnership Project; Technical Specification Group Radio Access Network; NR; Physical channels and modulation (Release 16)"; Sep. 2021 (134 pages).

(Continued)

*Primary Examiner* — Sudesh M. Patidar
(74) *Attorney, Agent, or Firm* — Osha Bergman Watanabe & Burton LLP

(57) ABSTRACT

A terminal includes: a reception unit configured to receive a signal from another terminal in a resource pool for which a partial sensing is configured; a control unit configured to determine a first resource of a sensing target, and determine an available resource set by identifying candidate resources based on a sensing result of the first resource according to the reception unit; and a transmission unit configured to select a second resource used for transmission from the resource set, and transmit a signal using the second resource. The control unit determines a procedure of performing reevaluation or preemption check, based on whether the second resource is a resource reserved by periodic reservation.

3 Claims, 18 Drawing Sheets

(56) References Cited

U.S. PATENT DOCUMENTS

2024/0298337 A1* 9/2024 Ye .......................... H04L 5/0042
2025/0234358 A1* 7/2025 Ko .......................... H04W 72/02

OTHER PUBLICATIONS

3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).
3GPP TS 38.214 V16.7.0; "3rd Generation Partnership Project; TTechnical Specification Group Radio Access Network; NR; Physical layer procedures for data (Release 16)"; Sep. 2021 (172 pages).
International Search Report issued in corresponding International Application No. PCT/JP2021/040895, mailed on Jun. 14, 2022 (3 pages).
Written Opinion issued in corresponding International Application No. PCT/JP2021/040895, mailed on Jun. 14, 2022 (4 pages).
H. Huawei; "Sidelink resource allocation to reduce power consumption"; 3GPP TSG RAN WG1 Meeting #106-e, R1-2106477; E-meeting; Aug. 16-27, 2021 (26 pages).
OPPO; "Discussion on power saving in NR sidelink communication"; 3GPP TSG RAN WG1 #106bis-e, R1-2109059; e-Meeting; Oct. 11-19, 2021 (19 pages).
Intel Corporation; "Outcome and TP of [101-e-NR-5G_V2X_NRSL-Mode-2-05]"; 3GPP TSG RAN WG1 Meeting #101-E, R1-2004942; e-Meeting; May 25-Jun. 5, 2020 (12 pages).

* cited by examiner

TERMINAL AND COMMUNICATION METHOD

FIELD OF THE INVENTION

The present invention relates to a terminal and a communication method in a wireless communication system.

BACKGROUND OF THE INVENTION

In LTE (Long Term Evolution) and LTE successor systems (e.g., LTE-A (LTE Advanced), NR (New Radio) (also referred to as 5G)), a D2D (Device to Device) technology in which terminals communicate directly with each other without using base station is being discussed (e.g., Non-Patent Document 1).

The D2D reduces traffic between the terminals and the base stations and enables communication between the terminals even when the base stations are unable to communicate during a disaster, etc. Although the 3GPP (3rd Generation Partnership Project) refers to D2D as a "sidelink," the more generic term D2D is used herein. However, in the description of embodiments described below, the sidelink is also used as needed.

The D2D communication is broadly classified into: D2D discovery for discovering other terminals capable of communication; and D2D communication (D2D direct communication, direct communication between terminals, etc.) for direct communication between terminals. Hereinafter, when D2D communication and D2D discovery are not specifically distinguished, it is simply called D2D. A signal sent and received by D2D is called a D2D signal. Various use cases of V2X (Vehicle to Everything) services in NR have been discussed (e.g., Non-Patent Document 2).

CITATION LIST

Non-Patent Document

Non-Patent Document 1: 3GPP TS 38.211 V16.7.0 (2021-09)

Non-Patent Document 2: 3GPP TR 22.886 V15.1.0 (2017-03)

Non-Patent Document 3: 3GPP TR 38.214 V16.7.0 (2021-09)

SUMMARY OF THE INVENTION

Technical Problem

Power saving has been discussed as an enhancement of the NR sidelink. For example, in the resource allocation mode 2, in which the terminal autonomously selects a resource, the terminal performs partial sensing to sense the limited resources in the sensing window and, based on the result, selects available resource candidates from the resource selection window.

Here, in NR sidelink, when a terminal performs monitoring by applying the partial sensing, an operation in a case of performing the reevaluation or preemption check has been unclear.

The present invention has been made in view of the above points, and is intended to perform autonomous resource selection appropriately in the device-to-device direct communication.

Solution to Problem

According to the disclosed technique, a terminal is provided. The terminal includes: a reception unit configured to receive a signal from another terminal in a resource pool for which a partial sensing is configured; a control unit configured to determine a first resource of a sensing target, and determine an available resource set by identifying candidate resources based on a sensing result of the first resource according to the reception unit; and a transmission unit configured to select a second resource used for transmission from the resource set, and transmit a signal using the second resource. The control unit determines a procedure of performing reevaluation or preemption check, based on whether the second resource is a resource reserved by periodic reservation.

Advantageous Effects of Invention

According to the disclosed technique, the autonomous resource selection can be performed appropriately in the device-to-device direct communication.

DETAILED DESCRIPTION OF THE PREFERRED EMBODIMENTS

Figure 1:
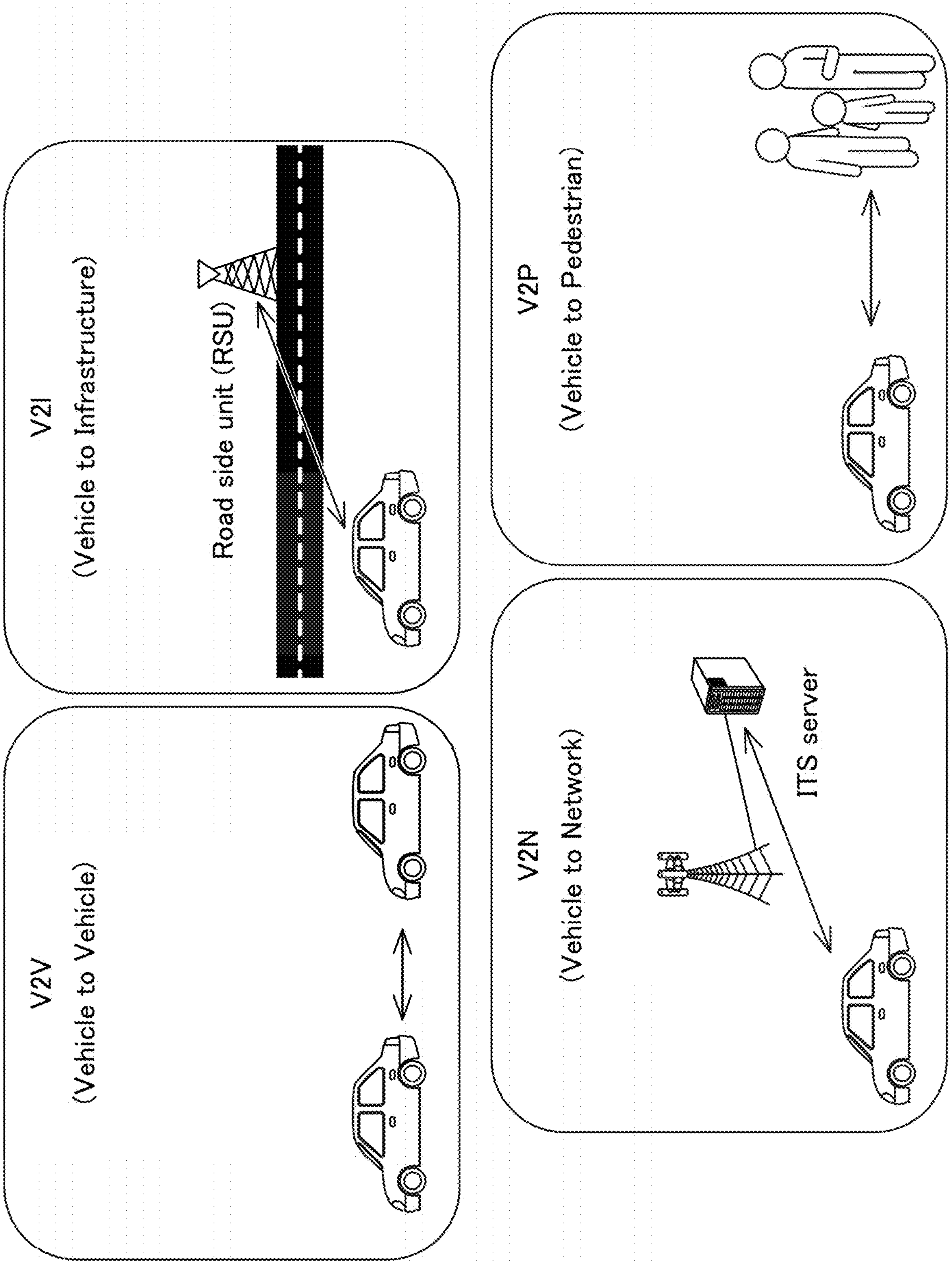
FIG. 1 is a drawing for describing V2X.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, a conventional technique will be used when it is appropriate. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR), or wireless LAN (Local Area Network).

In addition, in an embodiment of the present invention, the duplex method may be a TDD (Time Division Duplex) method, an FDD (Frequency Division Duplex) method, or any other method (e.g., Flexible Duplex, or the like).

Further, in an embodiment of the present invention, the expression, radio (wireless) parameters are "configured (set)" may mean that a predetermined value is pre-configured, or may mean that a radio parameter indicated by the base station 10 or the terminal 20 is configured.

FIG. 1 is a drawing illustrating V2X. In 3GPP, enhancing D2D functions to realize V2X (Vehicle to Everything) or eV2X (enhanced V2x) has been discussed and specifications are being developed. As illustrated in FIG. 1, V2X is a part of ITS (Intelligent Transport Systems) and is a generic name (collective name) for: V2V (Vehicle to Vehicle) referring to a form of communication performed between vehicles; V2I (Vehicle to Infrastructure) referring to a form of communication performed between a vehicle and a road-side unit (RSU) that is installed on roadside; V2N (Vehicle to Network) referring to a form of communication performed between a vehicle and an ITS server; and V2P (Vehicle to Pedestrian) referring to a form of communication performed between a vehicle and a mobile terminal that is carried by a pedestrian.

Further, in 3GPP, V2X using LTE/NR's cellular communication and communication between terminals has been discussed. V2X using cellular communication may be referred to as cellular V2X. In NR V2X, discussions have been performed to realize higher system capacity, reduced latency, higher reliability, and QoS (Quality of Service) control.

With respect to LTE V2X or NR V2X, it is assumed that discussions may be not limited to 3GPP specifications in the future. For example, it is assumed to be discussed on: how to secure interoperability; how to reduce cost by implementing higher layers; how to use or how to switch multiple RATs (Radio Access Technologies); how to handle regulations of each country; how to obtain and distribute data of LTE/NR V2X platform; and how to manage and use databases.

In an embodiment of the present invention, a form of embodiment is mainly assumed in which communication apparatuses are mounted on vehicles. However, an embodiment of the present invention is not limited to such a form. For example, communication apparatuses may be terminals carried by people, may be apparatuses mounted on drones or aircrafts, or may be base stations, RSUs, relay stations (relay nodes), terminals capable of scheduling, etc.

It should be noted that SL (Sidelink) may be distinguished from UL (Uplink) or DL (Downlink) based on any one of, or any combination of the following 1) through 4). Furthermore, SL may be referred to as a different name.

1) Resource arrangement in the time domain
2) Resource arrangement in the frequency domain
3) Synchronization signal to be referred to (including SLSS (Sidelink Synchronization Signal))
4) Reference signal that is used for path loss measurement used for transmission power control Further, with respect to OFDM (Orthogonal Frequency Division Multiplexing) of SL or UL, any of CP-OFDM (Cyclic-Prefix OFDM), DFT-S-OFDM (Discrete Fourier Transform-Spread-OFDM), OFDM without Transform precoding, and OFDM with Transform precoding may be applied.

In LTE SL, with respect to allocating SL resources to terminal 20, Mode 3 and Mode 4 are defined. In Mode 3, transmission resources are dynamically allocated using a DCI (Downlink Control Information) that is transmitted from a base station 10 to a terminal 20. Further, in Mode 3, SPS (Semi Persistent Scheduling) is enabled (available). In Mode 4, the terminal 20 autonomously selects transmission resources from a resource pool.

It should be noted that a slot in an embodiment of the present invention may be read as (replaced with) a symbol, a mini slot, a subframe, a radio frame, or a TTI (Transmission Time Interval). Further, a cell in an embodiment of the present invention may be read as (replaced with) a cell group, a carrier component, a BWP (bandwidth part), a resource pool, a resource, a RAT (Radio Access Technology), a system (including a wireless LAN), etc.

Note that, in an embodiment of the present invention, the terminal 20 is not limited to a V2X terminal, but may be any type of terminal that performs D2D communication. For example, the terminal 20 may be a terminal carried by a user, such as a smartphone, or an IoT (Internet of Things) device, such as a smart meter.

Figure 2:
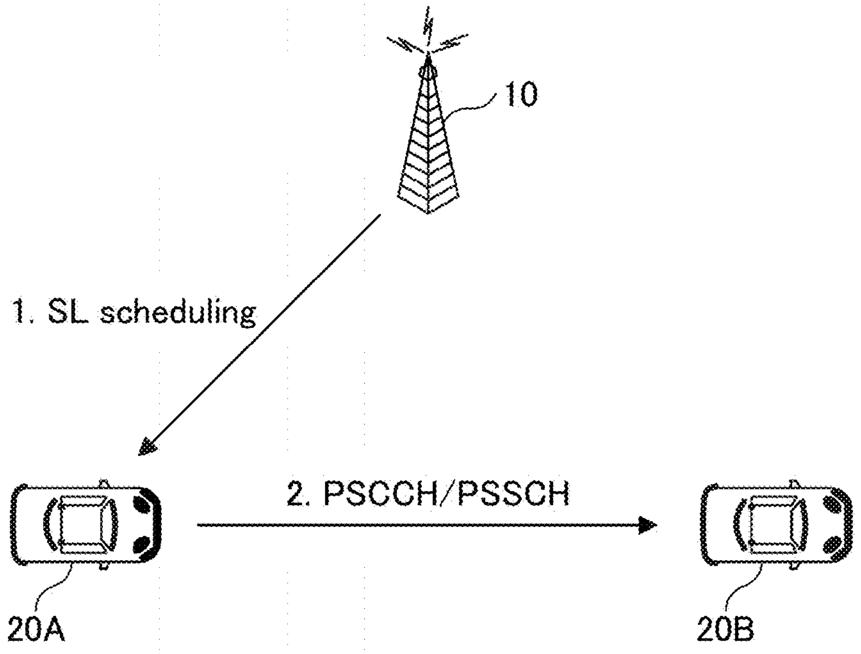
FIG. 2 is a drawing for describing an example (1) of a V2X transmission mode.

FIG. 2 is a drawing illustrating an example (1) of a V2X transmission mode. In a transmission mode of sidelink communication illustrated in FIG. 2, in step 1, a base station 10 transmits a sidelink scheduling to a terminal 20A. Next, the terminal 20A transmits PSCCH (Physical Sidelink Control Channel) and PSSCH (Physical Sidelink Shared Channel) to a terminal 20B based on the received scheduling (step 2). The transmission mode of sidelink communication illustrated in FIG. 2 may be referred to as a sidelink transmission mode 3 in LTE. In the sidelink transmission mode 3 in LTE, Uu based sidelink scheduling is performed. Uu is a radio interface between UTRAN (Universal Terrestrial Radio Access Network) and UE (User equipment). It should be noted that the transmission mode of sidelink communication illustrated in FIG. 2 may be referred to as a sidelink transmission mode 1 in NR.

Figure 3:
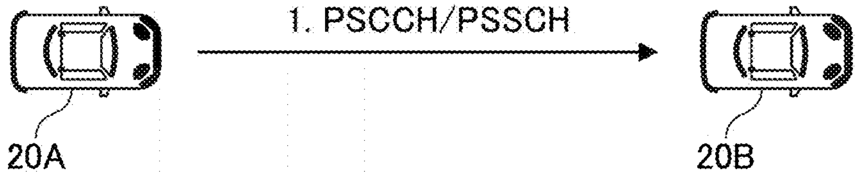
FIG. 3 is a drawing for describing an example (2) of a V2X transmission mode.

FIG. 3 is a drawing illustrating an example (2) of a V2X transmission mode. In a transmission mode of sidelink communication illustrated in FIG. 3, in step 1, a terminal 20A transmits PSCCH and PSSCH to a terminal 20B using autonomously selected resources. The transmission mode of sidelink communication illustrated in FIG. 3 may be referred to as a sidelink transmission mode 4 in LTE. In the sidelink transmission mode 4 in LTE, the UE itself performs resource selection.

Figure 4:
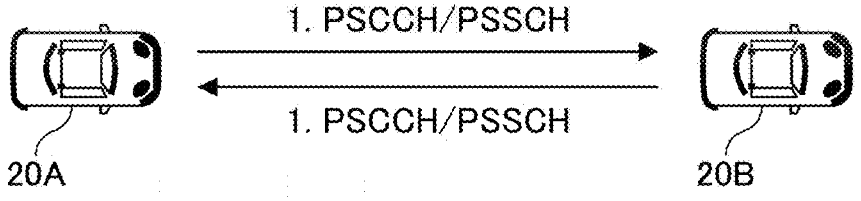
FIG. 4 is a drawing for describing an example (3) of a V2X transmission mode.

FIG. 4 is a drawing illustrating an example (3) of a V2X transmission mode. In a transmission mode of sidelink communication illustrated in FIG. 4, in step 1, a terminal 20A transmits PSCCH and PSSCH to a terminal 20B using autonomously selected resources. Similarly, the terminal 20B transmits PSCCH and PSSCH to the terminal 20A using autonomously selected resources (step 1). The transmission mode of sidelink communication illustrated in FIG. 4 may be referred to as a sidelink transmission mode 2a in NR. In the sidelink transmission mode 2 in NR, the terminal 20 itself performs resource selection.

Figure 5:
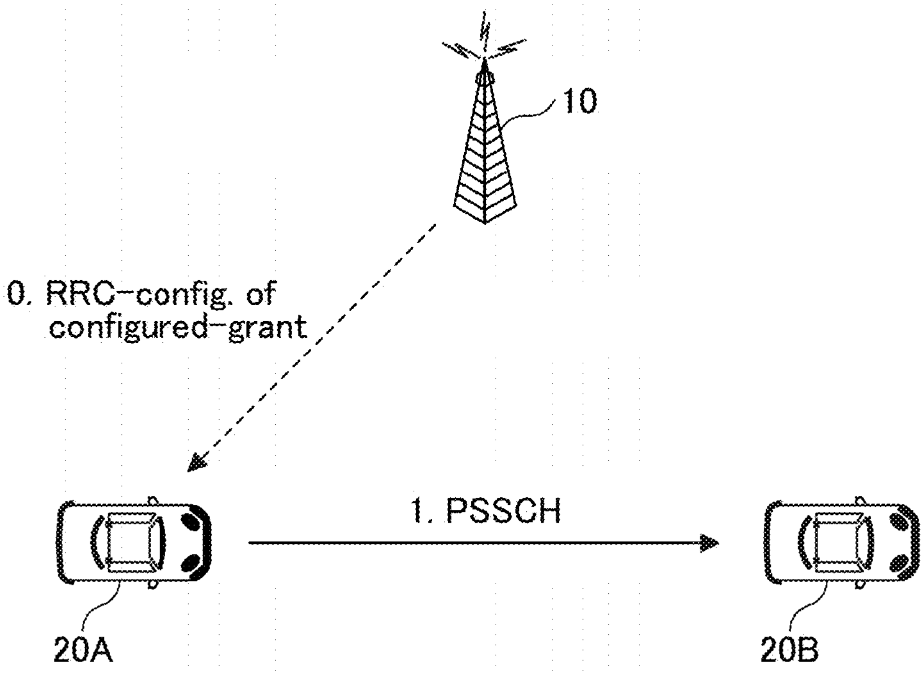
FIG. 5 is a drawing for describing an example (4) of a V2X transmission mode.

FIG. 5 is a drawing illustrating an example (4) of a V2X transmission mode. In the transmission mode of sidelink communication shown in FIG. 5, in step 0, the sidelink resource pattern is transmitted from the base station 10 to the terminal 20A via an RRC (Radio Resource Control) configuration, or is configured in advance. Subsequently, the terminal 20A transmits PSSCH to the terminal 20B, based on the resource pattern (step 1). The transmission mode of sidelink communication illustrated in FIG. 5 may be referred to as a sidelink transmission mode 2c in NR.

Figure 6:
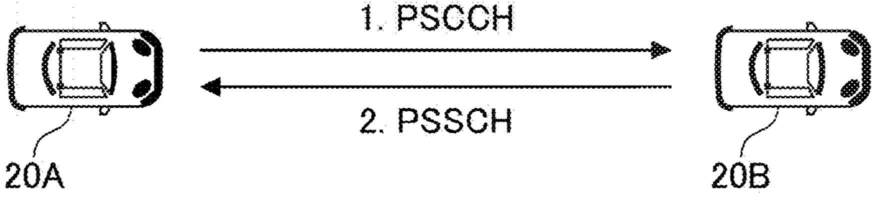
FIG. 6 is a drawing for describing an example (5) of a V2X transmission mode.

FIG. 6 is a drawing illustrating an example (5) of a V2X transmission mode. In the side-link communication transmission mode illustrated in FIG. 6, in step 1, the terminal 20A transmits sidelink scheduling to the terminal 20B via PSCCH. Next, the terminal 20B transmits PSSCH to the terminal 20A based on the received scheduling (step 2). The transmission mode of sidelink communication illustrated in FIG. 6 may be referred to as a sidelink transmission mode 2d in NR.

Figure 7:
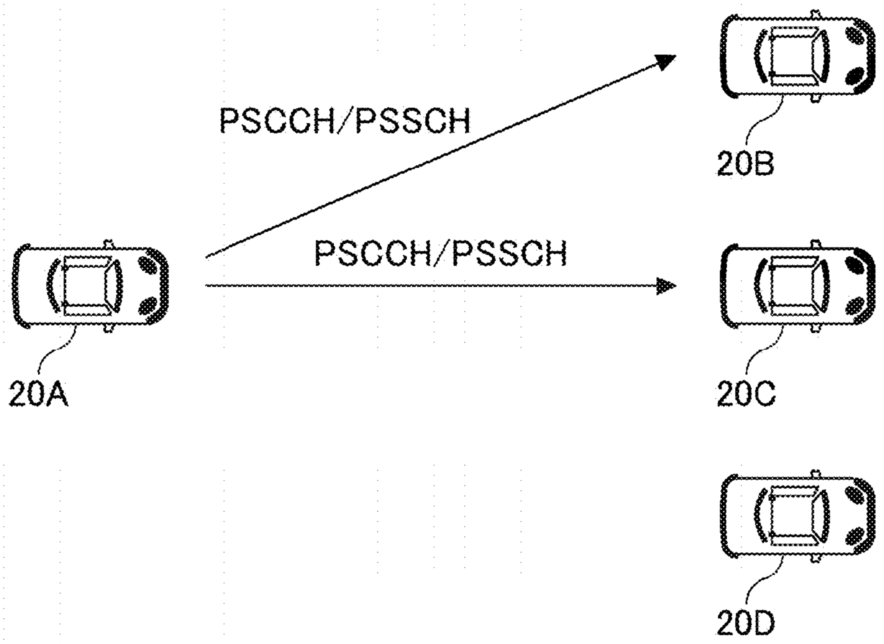
FIG. 7 is a drawing for describing an example (1) of a V2X communication type.

FIG. 7 is a drawing illustrating an example (1) of a V2X communication type. The sidelink communication type illustrated in FIG. 7 is unicast. The terminal 20A transmits PSCCH and PSSCH to the terminals 20. In an example illustrated in FIG. 7, the terminal 20A performs unicast to the terminal 20B, and performs unicast to a terminal 20C.

Figure 8:
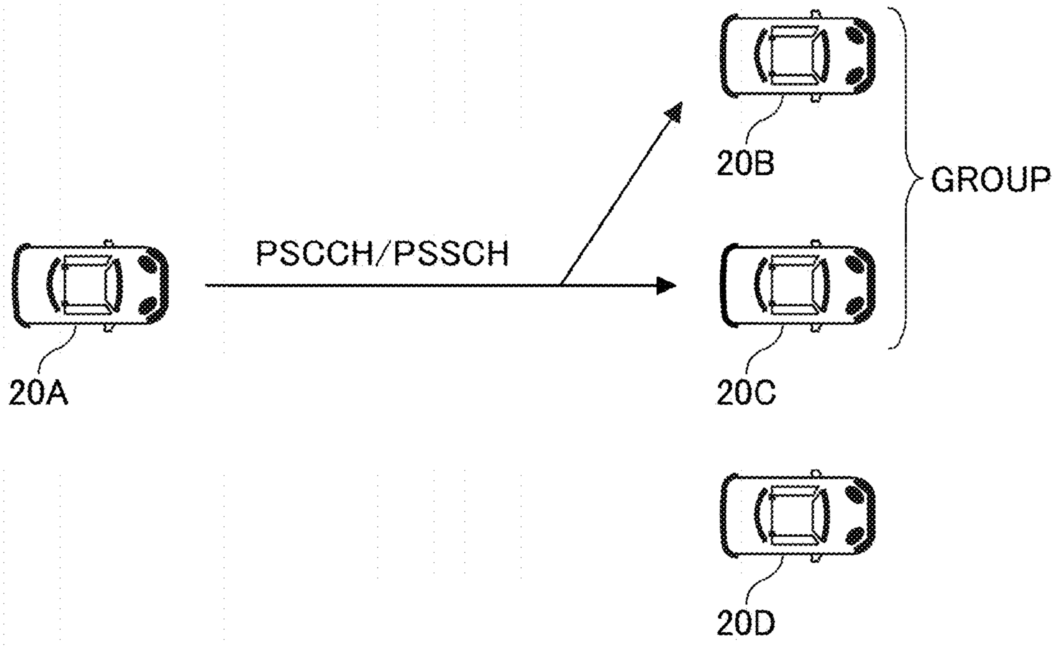
FIG. 8 is a drawing for describing an example (2) of a V2X communication type.

FIG. 8 is a drawing illustrating an example (2) of a V2X communication type. The sidelink communication type illustrated in FIG. 8 is groupcast. The terminal 20A transmits PSCCH and PSSCH to a group to which one or more terminals 20 belong. In an example illustrated in FIG. 8, the group includes a terminal 20B and the terminal 20C, and the terminal 20A performs groupcast to the group.

Figure 9:
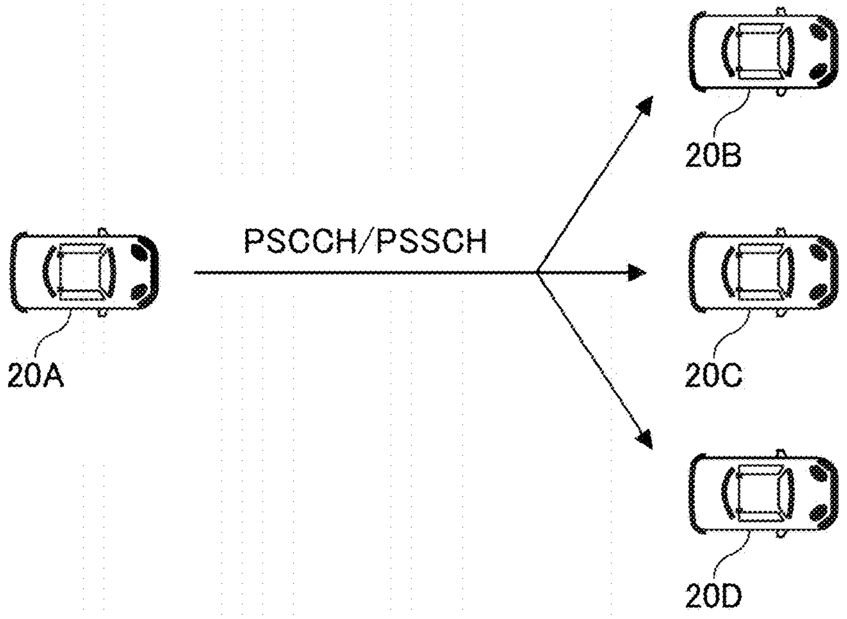
FIG. 9 is a drawing for describing an example (3) of a V2X communication type.

FIG. 9 is a drawing illustrating an example (3) of a V2X communication type. The sidelink communication type illustrated in FIG. 9 is broadcast. The terminal 20A transmits PSCCH and PSSCH to one or more terminals 20. In an example illustrated in FIG. 9, the terminal 20A performs broadcast to the terminal 20B, the terminal 20C, and a terminal 20D. Note that the terminal 20A shown in FIGS. 7 to 9 may be referred to as a header UE.

In addition, it is expected that HARQ (Hybrid automatic repeat request) is supported for unicast and groupcast of sidelink in NR-V2X. In addition, SFCI (Sidelink Feedback Control Information) containing a HARQ response is defined in NR-V2X. In addition, the transmitting of SFCI via PSFCH (Physical Sidelink Feedback Channel) is being discussed.

Note that, in the following description, it is assumed that PSFCH is used in the transmission of HARQ-ACK on sidelink. However, this is just an example. For example, PSCCH may be used to transmit HARQ-ACK on sidelink, PSSCH may be used to transmit HARQ-ACK on sidelink, or other channels may be used to transmit HARQ-ACK on sidelink.

Hereinafter, for the sake of convenience, the overall information reported by the terminal 20 in the HARQ is referred to as HARQ-ACK. This HARQ-ACK may also be referred to as HARQ-ACK information. Further, more specifically, a codebook applied to the HARQ-ACK information reported from the terminal 20 to the base station 10 or the like is called a HARQ-ACK codebook. The HARQ-ACK codebook defines a bit string (sequence) of the HARQ-ACK information. Note that "HARQ-ACK" sends not only ACK but also NACK.

Figure 10:
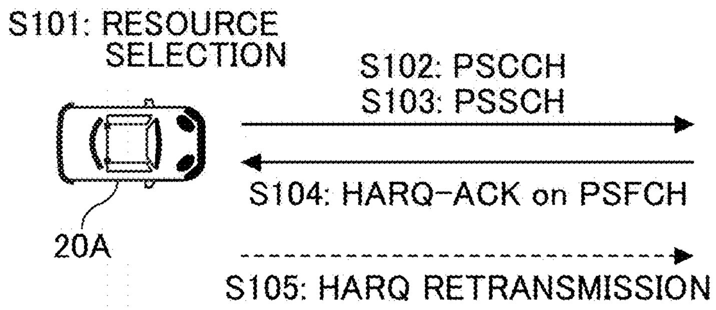
FIG. 10 is a sequence diagram illustrating an example (1) of a V2X operation.
Figure 11:
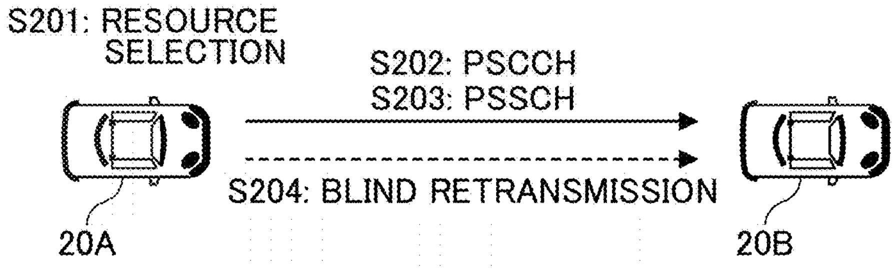
FIG. 11 is a sequence diagram illustrating an example (2) of a V2X operation.

FIG. 10 is a sequence diagram illustrating an example (1) of V2X operation. As shown in FIG. 10, the wireless communication system according to an embodiment of the present invention may include a terminal 20A and a terminal 20B. Note that there are many user devices, but FIG. 10 shows a terminal 20A and a terminal 20B as examples.

Hereinafter, when the terminals 20A, 20B, or the like are not particularly distinguished, the term "terminal 20" or "user device" will be used for the sake of convenience. FIG. 10 shows, for example, a case where both the terminal 20A and the terminal 20B are within a coverage of a cell. However, the operation in an embodiment of the present invention embodiment can be applied to a case where the terminal 20B is outside the coverage.

As described above, in an embodiment, the terminal 20 is, for example, a device mounted in a vehicle such as an automobile and has a cellular communication function as a UE in LTE or NR and a sidelink function. Terminal 20 may be a conventional portable terminal (such as a smartphone). Further, the terminal 20 may also be an RSU. The RSU may be a UE-type RSU having the function of a UE or a gNB-type RSU having the function of a base station device.

Note that the terminal 20 need not be a single housing device. For example, even when various sensors are arranged and distributed in a vehicle, a device including the various sensors may be a terminal 20.

Further, processing contents of sidelink transmission data of the terminal 20 are basically the same as those of UL transmission in LTE or NR. For example, the terminal 20 scrambles a codeword of the transmission data, modulates to generate complex-valued symbols, and maps the complex-valued symbols to one or two layers, and performs precoding. Further, the precoded complex-valued symbols are mapped to a resource element to generate a transmission signal (e.g., complex-valued time-domain SC-FDMA signal), and the generated signal is transmitted from each antenna port.

It is noted that the base station 10 has a function of cellular communication as a base station in LTE or NR and a function of enabling communication of the terminal 20 according to an embodiment of the present invention (e.g., resource pool setting, resource allocation, etc.). Further, the base station 10 may also be an RSU (gNB-type RSU).

Further, in the wireless communication system according to an embodiment of the present invention, a signal waveform used by the terminal 20 for SL or UL may be OFDMA, SC-FDMA, or other signal waveforms.

In step S101, the terminal 20A autonomously selects a resource to be used for PSCCH and PSSCH from a resource selection window having a predetermined period. The resource selection window may be configured to the terminal 20 by the base station 10. Here, the predetermined period of the resource selection window may be specified by an implementation condition of the terminal such as a processing time or a maximum allowable packet delay time, or may be specified in advance by technical specifications, and the predetermined period may be referred to as a section in a time domain.

In step S102 and Step S103, the terminal 20A transmits, using the resource autonomously selected in step S101, SCI (Sidelink Control Information) via PSCCH and/or PSSCH and transmits SL data via PSSCH. For example, the terminal 20A may transmit the PSCCH using a frequency resource adjacent to the PSSCH frequency resource with the same time resource as at least a portion of the time resource of the PSSCH.

The terminal 20B receives the SCI (PSCCH and/or PSSCH) and the SL data (PSSCH) transmitted from the terminal 20A. The received SCI may include information of a PSFCH resource for the terminal 20B to send HARQ-ACK for reception of the data. The terminal 20A may include information of the autonomously selected resource in the SCI and transmit the included information.

In step S104, the terminal 20B transmits a HARQ-ACK for the received data to the terminal 20A using the PSFCH resource specified by the received SCI.

In step S105, when the HARQ-ACK received in step S104 indicates a request for retransmission, that is, when the HARQ-ACK is a NACK (negative response), the terminal 20A retransmits the PSCCH and the PSSCH to the terminal 20B. The terminal 20A may retransmit the PSCCH and the PSSCH using an autonomously selected resource.

Note that in a case where HARQ control with HARQ feedback is not performed, step S104 and step S105 need not be performed.

FIG. 1 is a sequence diagram illustrating an example (2) of V2X operation. A non-HARQ-control-based blind retransmission may be performed to improve the transmission success rate or reach distance.

In step S201, the terminal 20A autonomously selects a resource to be used for PSCCH and PSSCH from a resource selection window having a predetermined period. The resource selection window may be configured to the terminal 20 by the base station 10.

In step S202 and step S203, the terminal 20A transmits, using the resource autonomously selected in step S201, an SCI via PSCCH and/or PSSCH, and transmits SL data via PSSCH. For example, the terminal 20A may transmit the PSCCH using a frequency resource adjacent to the PSSCH frequency resource with the same time resource as at least a portion of the time resource of the PSSCH.

In step S204, the terminal 20A retransmits, using the resource autonomously selected in step S201, the SCI via PSCCH and/or PSSCH and the SL data via PSSCH to the terminal 20B. The retransmission in step S204 may be performed multiple times.

It is noted that, if the blind retransmission is not performed, step S204 need not be performed.

Figure 12:
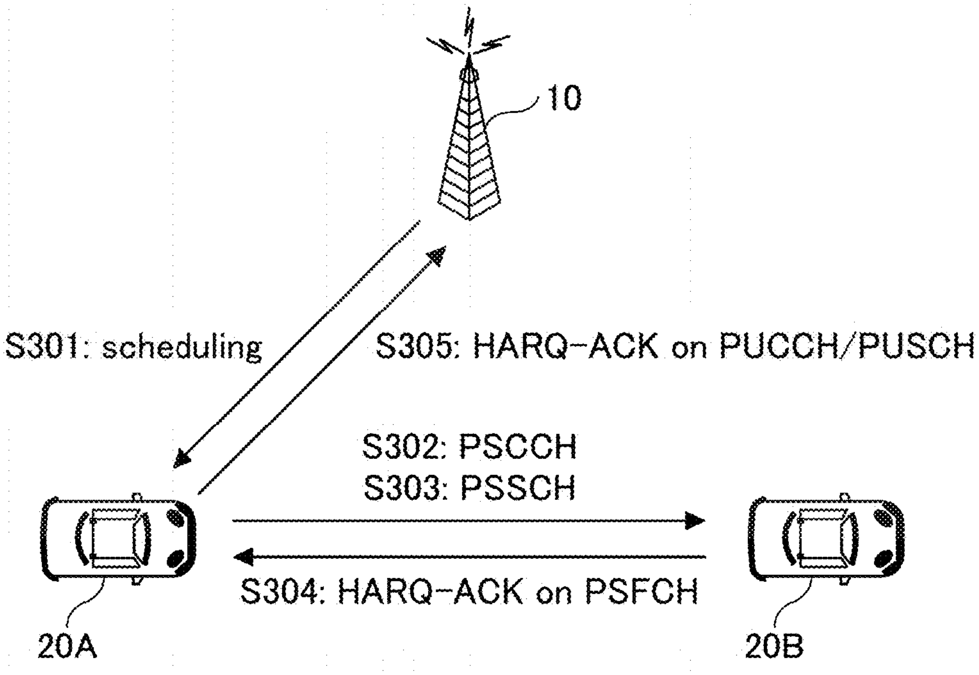
FIG. 12 is a sequence diagram illustrating an example (3) of a V2X operation.

FIG. 12 is a sequence diagram illustrating an example (3) of V2X operation. The base station 10 may perform scheduling of the sidelink. That is, the base station 10 may determine a sidelink resource to be used by the terminal 20 and transmit information indicating the resource to the terminal 20. In addition, in a case where HARQ control with HARQ feedback is to be applied, the base station 10 may transmit information indicating a PSFCH resource to the terminal 20.

In step S301, the base station 10 performs SL scheduling by sending DCI (Downlink Control Information) to the terminal 20A via PDCCH. Hereafter, for the sake of convenience, the DCI for SL scheduling is called SL scheduling DCI.

Further, in Step S301, it is assumed that the base station 10 also transmits DCI for DL scheduling (which may be referred to as DL assignment) to the terminal 20A via the PDCCH. Hereafter, for the sake of convenience, the DCI for DL scheduling is called a DL scheduling DCI. The terminal 20A, which has received the DL scheduling DCI, receives DL data via PDSCH using a resource specified by the DL scheduling DCI.

In step S302 and step S303, the terminal 20A transmits, using the resource specified by the SL scheduling DCI, SCI (Sidelink Control Information) via PSCCH and/or PSSCH and transmits SL data via PSSCH. Note that, in the SL scheduling DCI, only a PSSCH resource may be specified. In this case, for example, the terminal 20A may transmit the PSCCH using a frequency resource adjacent to the PSSCH frequency resource with the same time resource as at least a portion of the time resource of the PSSCH.

The terminal 20B receives the SCI (PSCCH and/or PSSCH) and the SL data (PSSCH) transmitted from the terminal 20A. The SCI received via the PSCCH and/or PSSCH includes information of a PSFCH resource for the terminal 20B to send a HARQ-ACK for reception of the data.

The information of the resource is included in the DL scheduling DCI or SL scheduling DCI transmitted from the base station 10 in S301, and the terminal 20A acquires the information of the resource from the DL scheduling DCI or the SL scheduling DCI and includes the acquired information in the SCI. Alternatively, the DCI transmitted from the base station 10 may be configured so as not to include the information of the resource, and the terminal 20A may autonomously include the information of the resource in the SCI and transmit the SCI including the information.

In step S304, the terminal 20B transmits a HARQ-ACK for the received data to the terminal 20A using the PSFCH resource specified by the received SCI.

In step S305, the terminal 20A transmits the HARQ-ACK using, for example, a PUCCH (Physical uplink control channel) resource specified by the DL scheduling DCI (or SL scheduling DCI) at the timing (e.g., slot-by-slot timing) specified by the DL scheduling DCI (or SL scheduling DCI), and the base station 10 receives the HARQ-ACK. The HARQ-ACK codebook may include HARQ-ACK received from the terminal 20B or HARQ-ACK generated based on PSFCH that is not received, and HARQ-ACK for the DL data. Note, however, the HARQ-ACK for DL data is not included if DL data is not allocated. In NR Rel. 16, the HARQ-ACK codebook does not include HARQ-ACK for DL data.

Note that in a case where HARQ control with HARQ feedback is not performed, step S304 and/or step S305 need not be performed.

Figure 13:
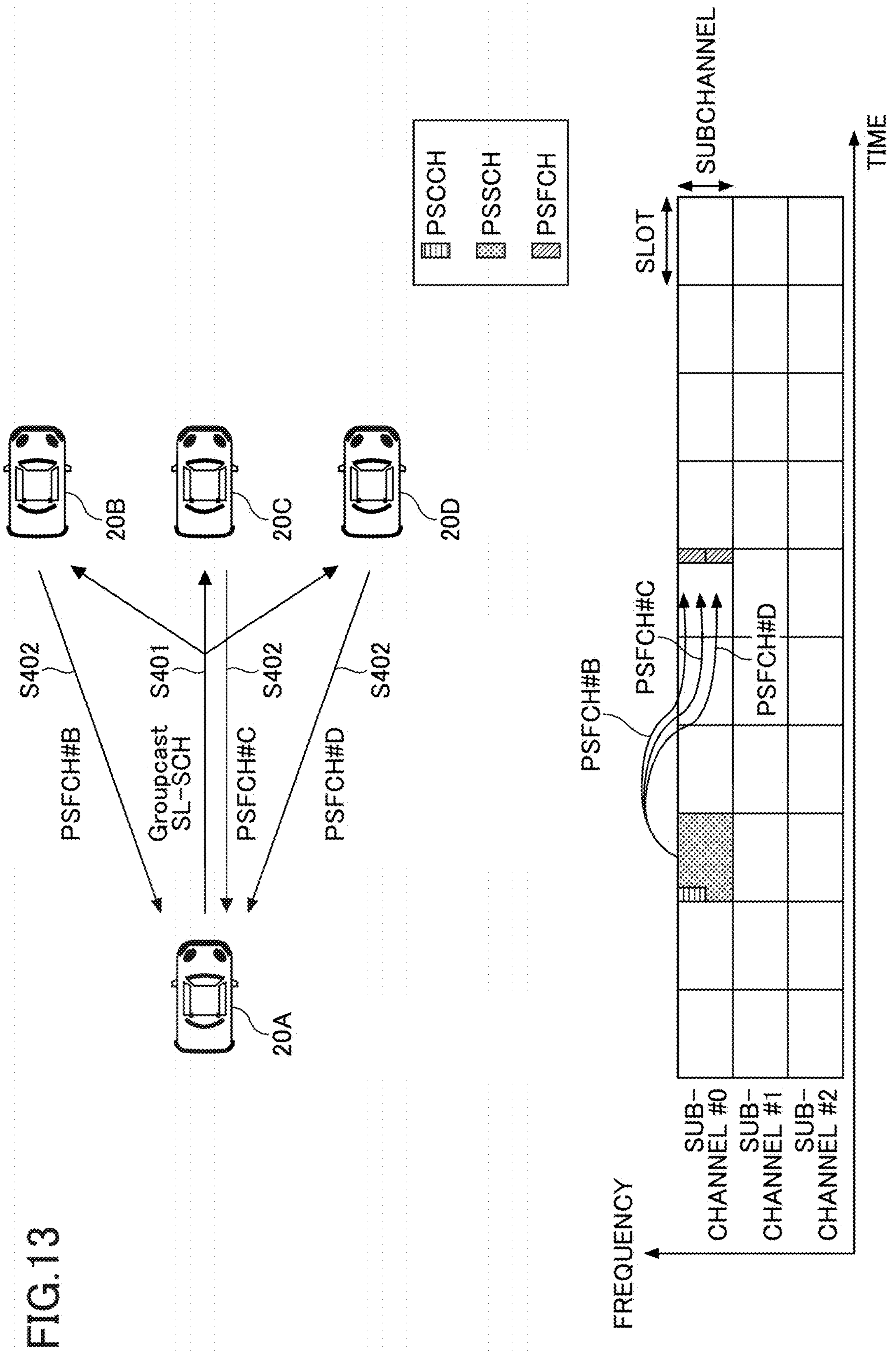
FIG. 13 is a sequence diagram illustrating an example (4) of a V2X operation.

FIG. 13 is a sequence diagram illustrating an example (4) of V2X operation. As described above, it is supported in the NR sidelink that the HARQ response is transmitted via PSFCH. It is noted that, with respect to the format of PSFCH, the same format as that of PUCCH (Physical Uplink Control Channel) format 0 can be used, for example. That is, the PSFCH format may be a sequence-based format with a PRB (Physical Resource Block) size of 1, ACK and NACK being identified by the difference of sequences and/or cyclic shifts. The format of PSFCH is not limited to the above-described format. PSFCH resources may be located at the last symbol of a slot or a plurality of last symbols of a slot. Further, a period N may be configured or predefined for the PSFCH resource. The period N may be configured or predefined in a unit of slot.

In FIG. 13, the vertical axis corresponds to the frequency domain and the horizontal axis corresponds to the time domain. PSCCH may be arranged at the first (beginning) symbol, may be arranged at a plurality of first symbols of a slot, or may be arranged at a plurality of symbols from a symbol other than the first symbol of a slot. PSFCH resources may be arranged at the last (ending) symbol of a slot, or may be arranged at a plurality of last symbols. Note that consideration of a symbol for AGC (Automatic Gain Control) and a symbol for switching transmission/reception may be omitted for the above "beginning of a slot" and "ending of a slot". That is, for example, in a case where one slot is composed of 14 symbols, the "beginning of a slot" and the "ending of a slot" may respectively mean a first symbol and a last symbol in 12 symbols in which the original first symbol and the original last symbol are excluded. In an example shown in FIG. 13, three sub-channels are configured in a resource pool, and two PSFCHs are arranged in a slot three slots after a slot in which PSSCH is arranged. Arrows from PSSCH to PSFCH indicate an example of PSFCH associated with PSSCH.

In a case of groupcast option 2 in which an ACK or NACK is transmitted in a HARQ response in the NR-V2X groupcast, it is necessary to determine resources used for transmitting and receiving PSFCH. As shown in FIG. 13, in step S401, the terminal 20A, which is the transmitting side terminal 20, performs groupcast with respect to the terminal 20B, the terminal 20C, and the terminal 20D, which are the receiving side terminals 20, via SL-SCH. In the subsequent step S402, the terminal 20B uses PSFCH #B, the terminal 20C uses PSFCH #C, and the terminal 20D uses PSFCH #D to transmit HARQ responses to the terminal 20A. Here, as shown in an example of FIG. 13, in a case where the number of PSFCH resources available is less than the number of receiving side terminals 20 belonging to the group, it is necessary to determine how to allocate PSFCH resources. It is noted that the transmitting side terminal 20 may obtain the number of the receiving side terminals 20 in the groupcast. Note that, in groupcast option 1, only NACK is transmitted as a HARQ response, and ACK is not transmitted.

Figure 14:
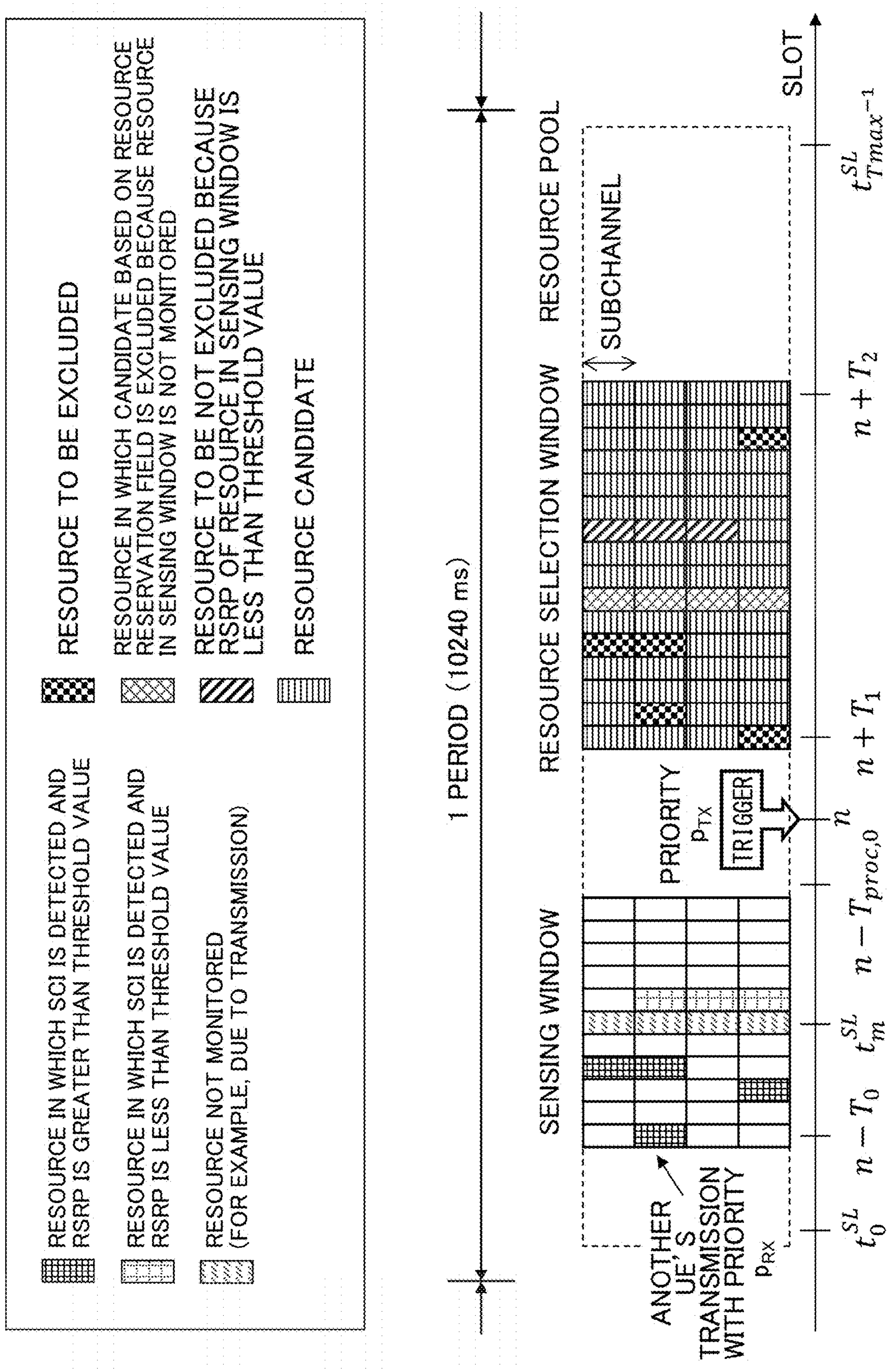
FIG. 14 is a drawing illustrating an example of a sensing operation.

FIG. 14 is a drawing illustrating an example of a sensing operation in NR. In the resource allocation mode 2, the terminal 20 selects a resource and performs transmission. As illustrated in FIG. 14, the terminal 20 performs sensing in a sensing window in a resource pool. According to the sensing, the terminal 20 receives a resource reservation field or a resource assignment field included in an SCI transmitted from another terminal 20, and identifies available resource candidates in a resource selection window in the resource pool, based on the received field. Subsequently, the terminal 20 randomly selects a resource from the available resource candidates.

Further, as shown in FIG. 14, the configuration of the resource pool may have a period. For example, the period may be a period of 10,240 milliseconds. FIG. 14 is an example in which slots from slot to$^{SL}$ to Slot $t_{Tmax-1}^{SL}$ are configured as a resource pool. The resource pool in each cycle may have an area configured by, for example, a bitmap.

In addition, as illustrated in FIG. 14, it is assumed that a transmission trigger in the terminal 20 occurs in a slot n and the priority of the transmission is $p_{TX}$. In the sensing window from slot n-$T_0$ to the slot immediately before the slot n-$T_{proc,0}$, the terminal 20 can detect, for example, that another terminal 20 is performing transmission having priority $p_{RX}$. In a case where an SCI is detected in the sensing window and the RSRP (Reference Signal Received Power) exceeds a threshold value, the resource in the resource selection window corresponding to the SCI is excluded. In addition, in a case where an SCI is detected in the sensing window and the RSRP is less than the threshold value, the resource in the resource selection window corresponding to the SCI is not excluded. The threshold value may be, for example, a threshold value $Th_{pTX, pRX}$ configured or defined for each resource in the sensing window, based on the priority $p_{TX}$ and the priority $p_{RX}$.

In addition, a resource in the resource selection window that is a candidate of resource reservation information corresponding to a resource that is not monitored in the sensing window due to transmission, such as the slot $t_m^{SL}$ shown in FIG. 14, is excluded.

In the resource selection window from slots n+$T_1$ to n+$T_2$, as shown in FIG. 14, resources occupied by other UEs are identified, and resources from which the identified resources are excluded become available resource candidates. Assuming that the set of available resource candidates is $S_A$, in a case where the $S_A$ is less than 20% of the resource selection window, the resource identification may be performed again by raising the threshold value $Th_{pTX, pRX}$ configured for each resource in the sensing window by 3 dB. That is, by raising the threshold value $Th_{pTX, pRX}$ and performing the resource identification again, resources that are not excluded because the RSRP is below the threshold value may be increased, and the set $S_A$ of resource candidates may become greater than 20% of the resource selection window. The operation of raising the threshold value $Th_{pTX, pRX}$ configured for each resource in the sensing window by 3 dB, and of performing the resource identification again in a case where the $S_A$ is less than 20% of the resource selection window, may be repeatedly performed.

The lower layer of the terminal 20 may report the $S_A$ to the higher layer. The higher layer of the terminal 20 may perform random selection for the $S_A$ to determine a resource to be used. The terminal 20 may perform sidelink transmission using the determined resource.

Although an operation of the transmission-side terminal 20 has been described with reference to FIG. 14, the reception-side terminal 20 may detect data transmission from another terminal 20, based on a result of sensing or partial sensing and receive data from the another terminal 20.

Figure 15:
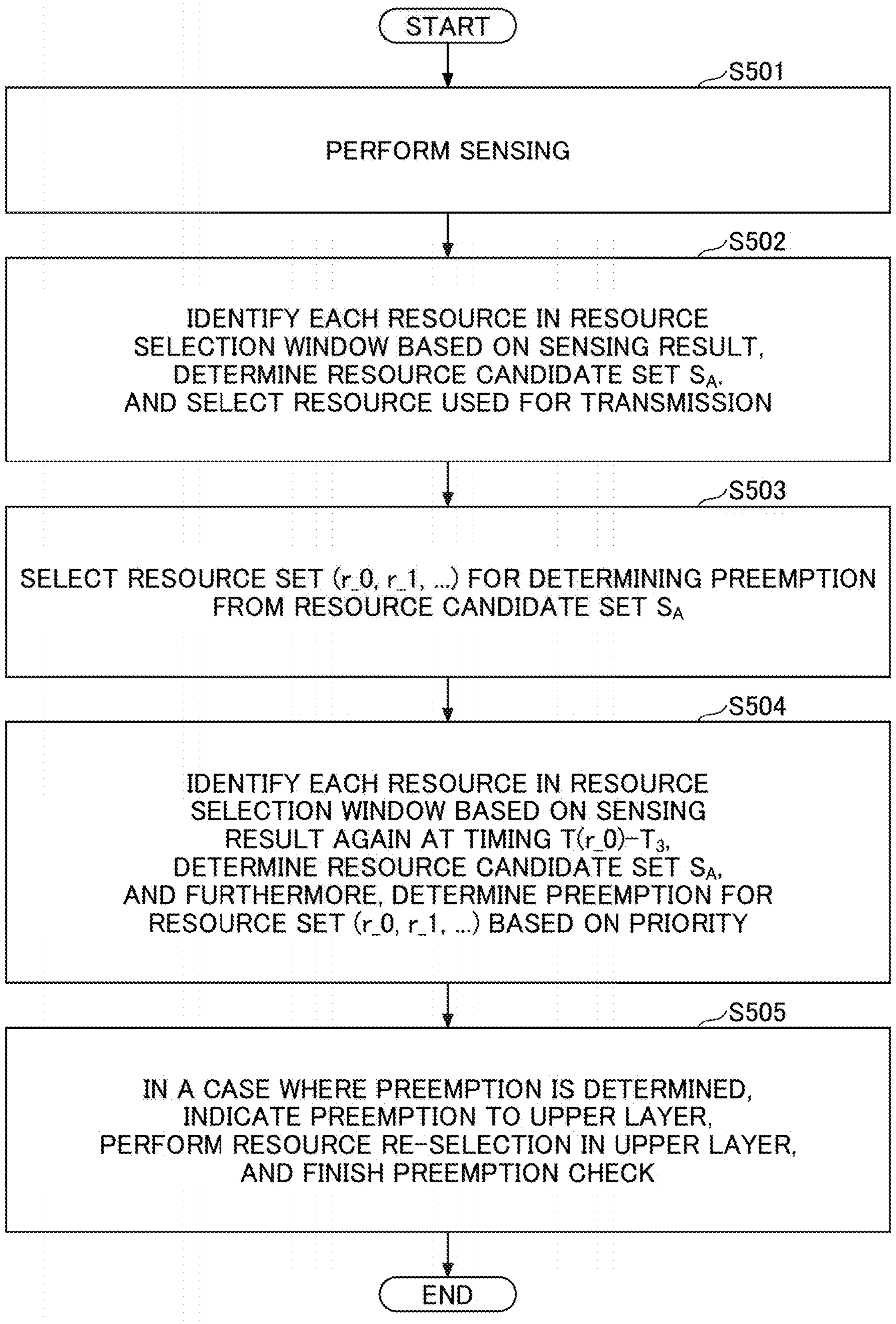
FIG. 15 is a flowchart for describing an example of a preemption operation.
Figure 16:
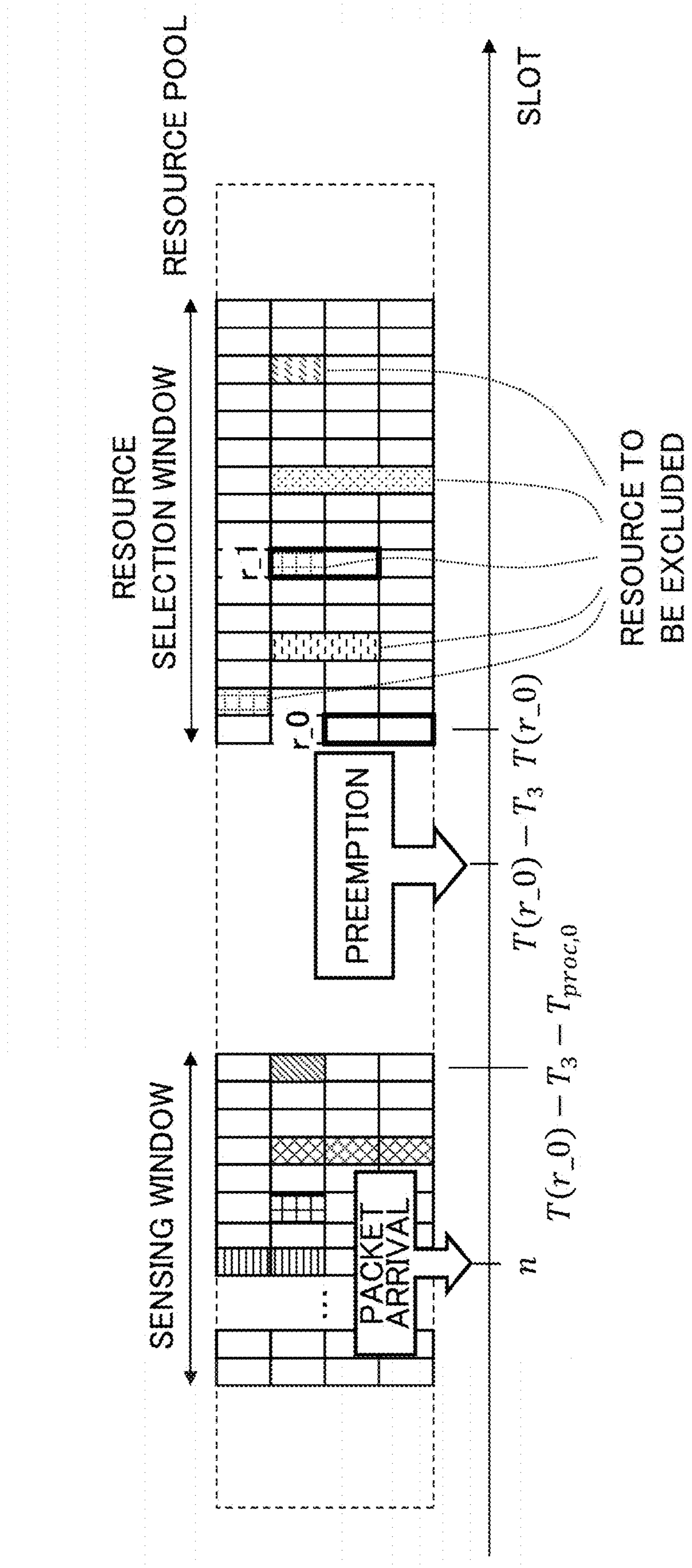
FIG. 16 is a drawing illustrating an example of a preemption operation.

FIG. 15 is a flowchart illustrating an example of preemption in NR. FIG. 16 is a diagram illustrating an example of preemption in NR. In step S501, the terminal 20 performs sensing in the sensing window. In a case where the terminal 20 performs a power saving operation, the sensing may be performed in a limited period specified in advance. Subsequently, the terminal 20 identifies each resource in the resource selection window, based on the sensing result, determines a set $S_A$ of resource candidates, and selects a resource to be used for transmission (S502). Subsequently, the terminal 20 selects a resource set (r_0, r_1, . . . ) for determining preemption from the set $S_A$ of resource candidates (S503). The resource set may be indicated from the upper layer to the PHY layer as a resource for determining whether preemption has been performed.

In step S504, at the timing of T(r_0)-$T_3$ shown in FIG. 16, the terminal 20 identifies again each resource in the resource selection window, based on the sensing result to determine the set $S_A$ of resource candidates, and further determines preemption for the resource set (r_0, r_1, . . . ), based on the priority. For example, with respect to r_1 illustrated in FIG. 16, the SCI transmitted from the other terminal 20 is detected by repeated sensing, and r_1 is not included in $S_A$. In a case where the preemption is enabled, in a case where the value prio_RX indicating the priority of the SCI transmitted from the another terminal 20 is lower than the value prio_TX indicating the priority of the transport block to be transmitted from the terminal 20 itself, the terminal 20 determines that the resource r_1 has been preempted. Note that the lower the value indicating the priority, the higher the priority. That is, in a case where the value prio_RX indicating the priority of the SCI transmitted from the other terminal 20 is higher than the value prio_TX indicating the priority of the transport block to be transmitted from the terminal 20 itself, the terminal 20 does not exclude the resource r_1 from the $S_A$. Alternatively, in a case where the preemption is enabled only for a specific priority (for example, sl-PreemptionEnable is pl1, pl2, . . . , or pl8), the priority is referred to as prio_pre. Here, in a case where the value prio_RX indicating the priority of the SCI transmitted from the another terminal 20 is lower than prio_pre, and where the value prio_RX is lower than the value prio_TX indicating the priority of the transport block to be transmitted from the terminal 20 itself, the terminal 20 determines that the resource r_1 has been preempted.

In step S505, in a case where the preemption is determined in step S504, the terminal 20 indicates, to the higher layer, the preemption, reselects resources at the higher layer, and ends the preemption check.

Note that, in a case where re-evaluation is performed instead of the preemption check, in step S504, after determining the set $S_A$ of resource candidates, in a case where the $S_A$ does not include resources of the resource set (r_0, r_1, . . . ), the resource is not used and the resource reselection is performed at the upper layer.

Figure 17:
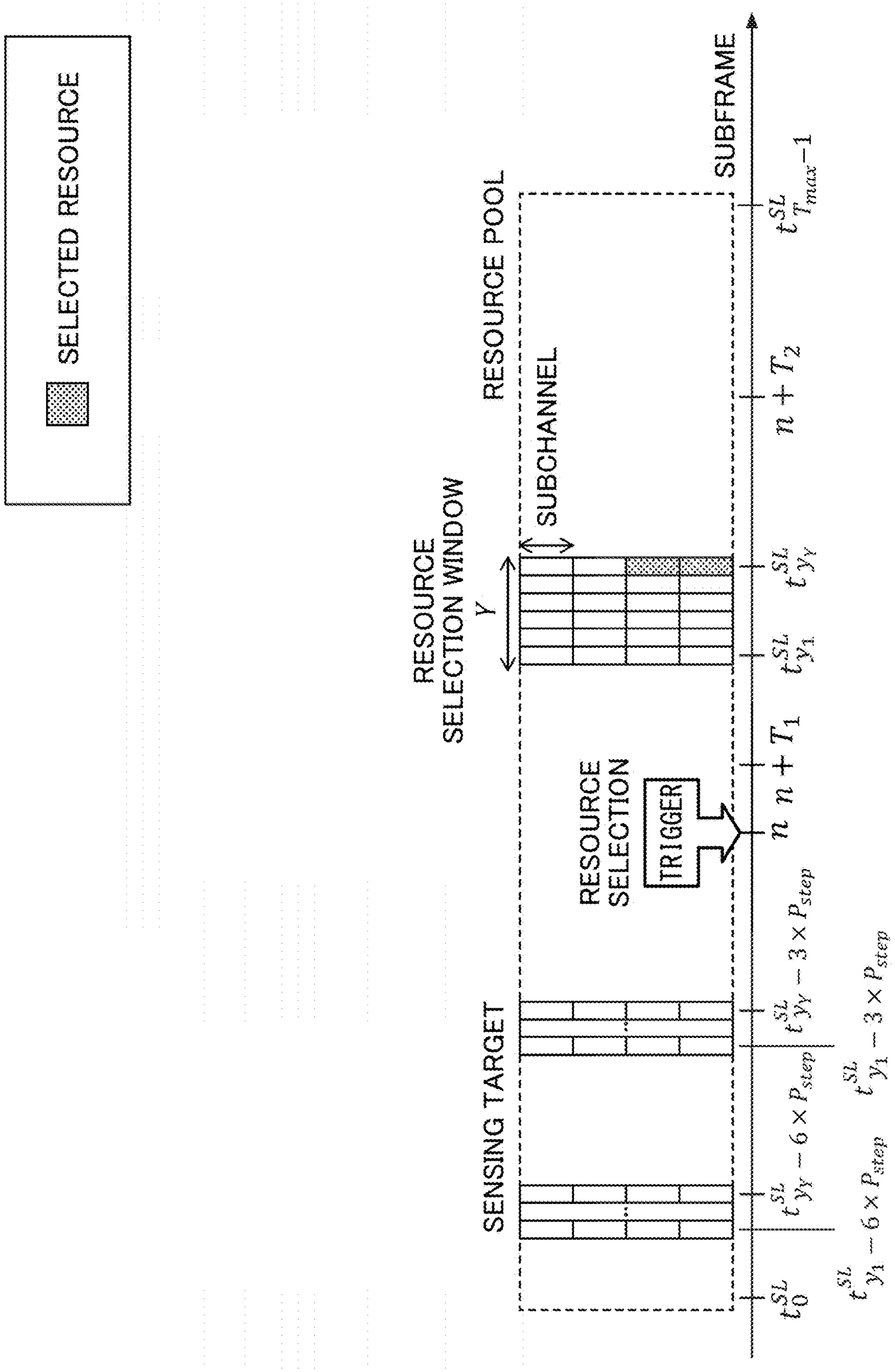
FIG. 17 is a drawing illustrating an example of a partial sensing operation.

FIG. 17 is a drawing illustrating an example of a partial sensing operation in LTE. In a case where the partial sensing is configured by the upper layer in the LTE sidelink, the terminal 20 selects resources and perform transmission as shown in FIG. 17. As shown in FIG. 17, the terminal 20 performs partial sensing for a part of the sensing window in the resource pool, i.e., the sensing target. According to the partial sensing, the terminal 20 receives the resource reservation field contained in the SCI transmitted from the another terminal 20 and identifies the available resource candidates in the resource selection window in the resource pool, based on the field. Subsequently, the terminal 20 randomly selects a resource from the available resource candidates.

FIG. 17 is an example in which subframes from subframe $t_0^{SL}$ to subframe $t_{Tmax-1}^{SL}$ are configured as a resource pool. The resource pool may have a target area configured by a bitmap, for example. As shown in FIG. 17, the transmission trigger at the terminal 20 is assumed to occur in subframe n. As shown in FIG. 17, among the subframes from subframe $n+T_1$ to subframe $n+T_2$, Y subframes from subframe $t_{y1}^{SL}$ to subframe $t_{yY}^{SL}$ may be configured as the resource selection window.

The terminal 20 can detect, for example, that another terminal 20 is performing transmission in one or more sensing targets from subframe $t_{y1-k\times Pstep}^{SL}$ to subframe $t_{yY-k\times Pstep}^{SL}$, the length being Y subframes. The k may be determined by a 10-bit bitmap, for example. FIG. 17 shows an example in which the third and sixth bits of the bitmap are configured to "1" indicating that the partial sensing is to be performed. That is, in FIG. 17, subframes from subframe $t_{y1-6\times Pstep}^{SL}$ to subframe $t_{yY-6\times Pstep}^{SL}$, and subframes from subframe $t_{y1-3\times Pstep}^{SL}$ to subframe $t_{yY-3\times Pstep}^{SL}$ are configured as the sensing targets. As described above, the kth bit of the bitmap may correspond to a sensing window from subframe $t_{y1-k\times Pstep}^{SL}$ to subframe $t_{yY-k\times Pstep}^{SL}$. Note that $y_i$ corresponds to the index (1 . . . Y) in the Y subframes.

Note that k may be configured in a 10-bit bitmap or defined in advance, and $P_{step}$ may be 100 ms. However, in a case where SL communication is performed using DL and UL carriers, $P_{step}$ may be (U/(D+S+U))*100 ms. U corresponds to the number of UL subframes, D corresponds to the number of DL subframes, and S corresponds to the number of special subframes.

In a case where an SCI is detected in the above sensing target and the RSRP exceeds the threshold value, the resource in the resource selection window corresponding to the resource reservation field of the SCI is excluded. Also, in a case where an SCI is detected in the sensing target and the RSRP is less than the threshold value, the resource in the resource selection window corresponding to the resource reservation field of the SCI is not excluded. The threshold value may be, for example, a threshold value $Th_{pTX,\ pRX}$ configured or defined for each resource in the sensing target, based on the transmission-side priority pTX and the reception-side priority $p_{RX}$.

As shown in FIG. 17, in a resource selection window configured in the Y subframes in the section $[n+T_1, n+T_2]$, the terminal 20 identifies a resource occupied by another UE, and the resource excluding the identified resource becomes available resource candidates. Note that the Y subframes need not be contiguous. Assuming that the set of available resource candidates is $S_A$, in a case where the $S_A$ is less than 20% of the resource selection window, the resource identification may be performed again by raising the threshold value $Th_{pTX,\ pRX}$ configured for each resource in the sensing target by 3 dB.

That is, resources that are not excluded because the RSRP is less than the threshold value may be increased by raising the threshold value $Th_{pTX,\ pRX}$ and by performing the resource identification again. In addition, the RSSI of each resource in the $S_A$ may be measured and the resource with the lowest RSSI may be added to the set $S_B$. The operation of adding the resource with the lowest RSSI included in the $S_A$ to the $S_B$ may be repeated until the set $S_B$ of resource candidates becomes equal to or greater than 20% of the resource selection window.

The lower layer of the terminal 20 may report the $S_B$ to the higher layer. The higher layer of the terminal 20 may perform random selection for the $S_B$ to determine a resource to be used. The terminal 20 may perform sidelink transmission using the determined resource. Note that the terminal 20 may use the resource periodically without performing the sensing for a predetermined number of times (e.g., $C_{resel}$ times) after the resource is once secured.

Here, power saving based on random resource selection and partial sensing is being discussed in NR Release 17 Sidelink. For example, for the sake of power savings, random resource selection and partial sensing of sidelink in LTE release 14 may be applied to resource allocation mode 2 of NR release 16 sidelink. The terminal 20 to which partial sensing is applied performs reception and sensing only in specific slots in the sensing window.

In addition, in NR release 17 sidelink, improvement of the latency performance and reliability using inter-terminal coordination (inter-UE coordination) as a baseline is being discussed. For example, the terminal 20A may share information indicating a resource set with the terminal 20B, and the terminal 20B may take into account this information in selecting resources for transmission.

For example, as a resource allocation method in the sidelink, the terminal 20 may perform full sensing as shown in FIG. 14. In addition, the terminal 20 may perform partial sensing in which resource identification is performed by sensing only limited resources as compared to full sensing, and in which resource selection from the identified resource set is performed. Further, the terminal 20 may, without excluding resources from the resources in the resource selection window, cause the resources in the resource selection window to be an identified resource set and may perform random selection to select a resource from the identified resource set.

Note that the method of: performing random selection at the time of resource selection; and using sensing information at the time of reevaluation or preemption checking, may be treated as partial sensing or as random selection.

The following 1) and 2) may be applied as operations in sensing. Note that the sensing and the monitoring may be read interchangeably, and at least one of: measurement of received RSRP; acquisition of reserved resource information; or acquisition of priority information, may be included in the operation.

1) Periodic-Based Partial Sensing

Operation of determining the sensing slots, based on the reservation periodicity in a mechanism in which sensing is performed only for some slots. Note that the reservation periodicity is a value related to the resource reservation period field. The period may be replaced by the periodicity. Hereinafter, the sensing slots may be referred to as monitoring slots.

2) Contiguous Partial Sensing

Operation of determining the sensing slots, based on an aperiodic reservation in a mechanism in which sensing is performed only for some slots. Note that the aperiodic reservation is a value related to the time resource assignment field.

In Release 17, operations may be specified assuming 3 types of terminals 20. One type is Type A, where a Type A terminal 20 does not have capability of receiving any sidelink signals and channels. However, exceptions may be made for receiving PSFCH and S-SSB.

Another type is Type B, where a Type B terminal 20 does not have capability of receiving any sidelink signals and channels except for PSFCH and S-SSB reception.

Yet another type is Type D, where a Type D terminal 20 has capability of receiving all sidelink signals and channels as defined in Release 16. However, reception of some sidelink signals and channels is not excluded.

It should be noted that UE types other than Type A, Type B and Type D mentioned above may be assumed, and the UE type and UE capability may or need not be associated with each other.

In addition, in release 17, multiple resource allocation methods may be configured for a resource pool. In addition, SL-DRX (Discontinuous reception) is supported as one of the power saving functions. That is, the reception operation is performed only for a predetermined section.

As described above, partial sensing is supported as one of the power saving functions. In a resource pool in which partial sensing is configured, the terminal 20 may perform the periodic partial sensing described above. The terminal 20 may receive, from the base station 10, information for configuring a resource pool in which partial sensing is configured and in which periodic reservation is configured to be enabled.

Figure 18:
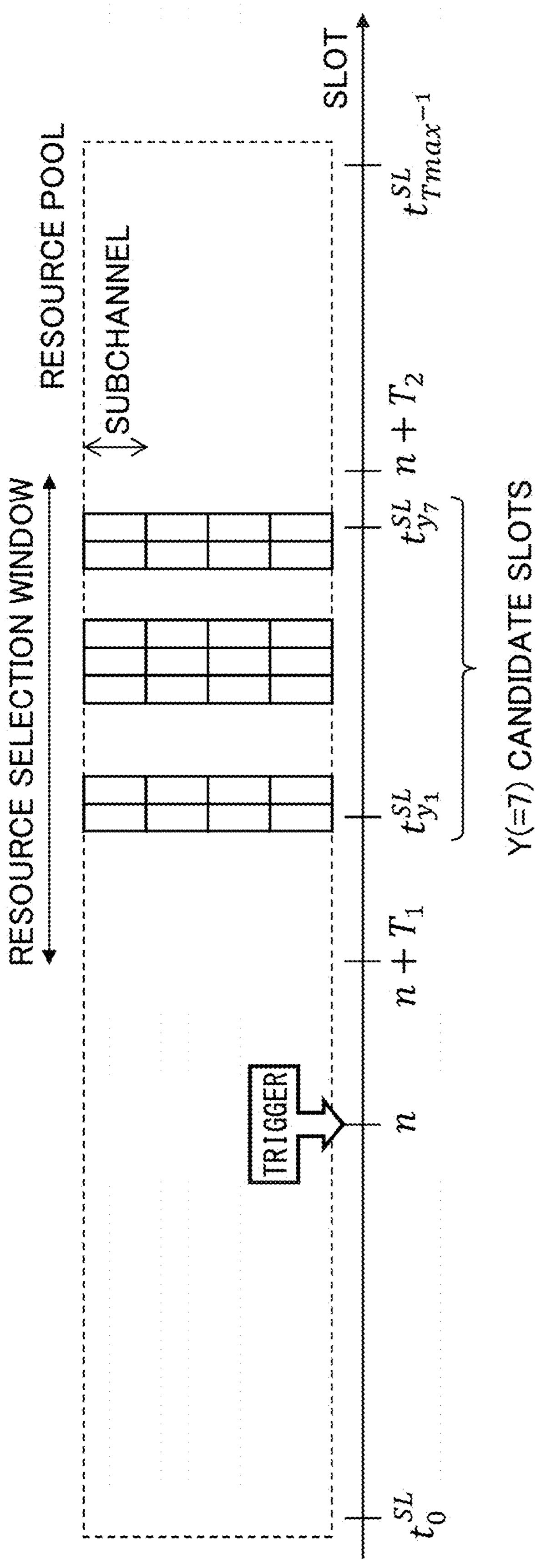
FIG. 18 is a drawing for describing an example of periodic-based partial sensing.

FIG. 18 is a drawing illustrating an example of periodic partial sensing. As shown in FIG. 18, Y candidate slots for resource selection are selected from a resource selection window $[n+T_1, n+T_2]$. It is to be noted that an operation described below may be referred to as a method of determining monitoring slots corresponding to the periodic-based partial sensing (PBPS).

Assuming that $t_y^{SL}$ is a slot included in the Y candidate slots, sensing may be performed by having $t_{y-k\times Preserve}^{SL}$ as a target slot of the periodic partial sensing.

The $P_{reserve}$ may correspond to any value included in sl-ResouceReservePeriodList that is configured or predefined. Alternatively, the value of $P_{reserve}$ that is limited to a subset of sl-ResouceReservePeriodList may be configured or predefined. The $P_{reserve}$ and sl-ResouceReservePeriodList may be configured for each transmission resource pool of the resource allocation mode 2. In addition, as a UE implementation, a period included in sl-ResouceReservePeriodList other than the limited subset, may be monitored. For example, the terminal 20 may additionally monitor an occasion corresponding to P_RSVP_Tx.

Regarding the k value, the terminal 20 may monitor the latest sensing occasion in a reservation period: before slot n of the resource selection trigger; or before the first slot of the Y candidate slots subject to a processing time limitation. In addition, regarding the terminal 20, the (pre)configuration related to the k value may be performed so that one or more periodic sensing occasions are to be additionally monitored, and the monitoring may be performed based on the (pre) configuration. For example, as the k value, a value corresponding to the latest sensing occasion in a certain reservation period: before slot n of the resource selection trigger; or before the first slot of the Y candidate slots subject to the processing time limitation, and a value corresponding to the sensing occasion immediately before the latest sensing occasion in the certain reservation period, may be configured.

As described above, partial sensing is supported as one of the power saving functions. In a resource pool in which partial sensing is configured, the terminal 20 may perform the contiguous partial sensing described above. The terminal 20 may receive, from the base station 10, information for configuring a resource pool in which partial sensing is configured and in which aperiodic reservation is configured to be enabled.

Figure 19:
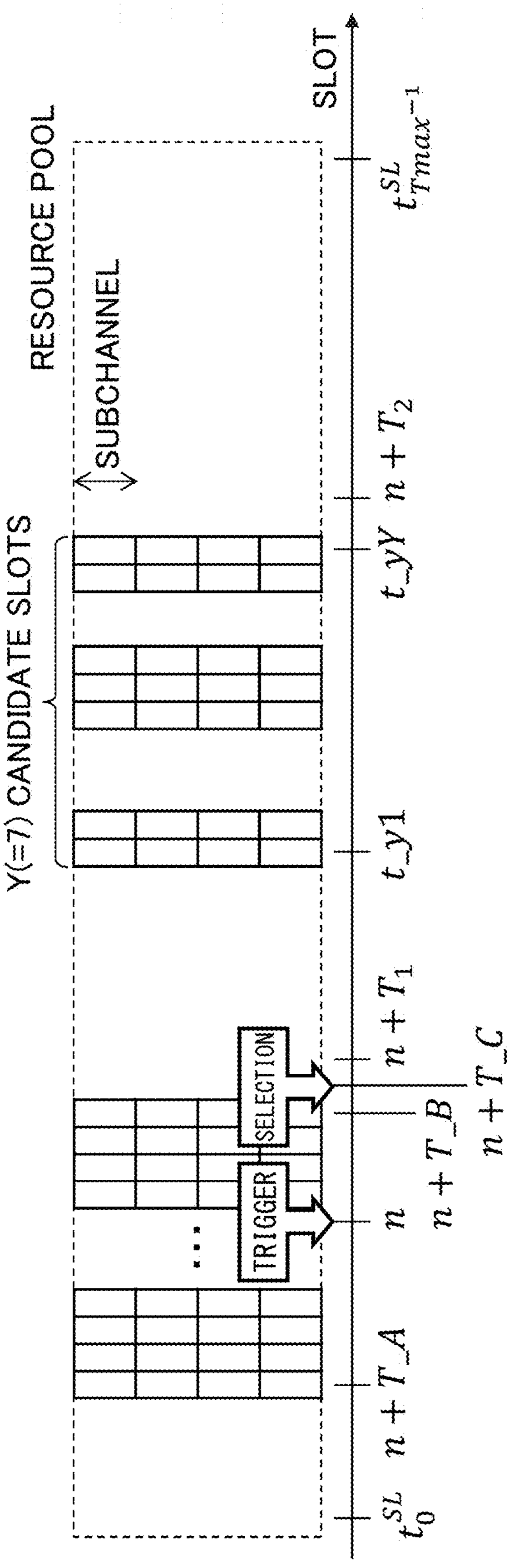
FIG. 19 is a drawing for describing an example of contiguous partial sensing.

FIG. 19 is a drawing illustrating an example of contiguous partial sensing. As shown in FIG. 19, in a case where the trigger for resource selection is slot n, the terminal 20 selects the Y candidate slots for resource selection from the resource selection window $[n+T_1, n+T_2]$. FIG. 19 is an example for the case of Y=7. As shown in FIG. 19, the beginning of the Y candidate slots is denoted as slot $t_{y1}$, the subsequent slot is denoted as $t_{y2}$, . . . , and the end of the Y candidate slots is denoted as slot $t_{yY}$. It is to be noted that an operation described below may be referred to as a method of determining monitoring slots corresponding to the contiguous partial sensing (CPS).

The terminal 20 performs sensing in the section $[n+T_A, n+T_B]$ and performs resource selection at $n+T_B$ or after $n+T_B$ (referred to as $n+T\_C$). Note that the periodic partial sensing described above may be additionally performed. In addition, $n+T\_A$ or $n+T_B$ may be a value that is not based on the slot n, or may be determined to be a value based on $t_{y1}$.

Note that, candidate resources that are targets of resource selection are described as Y candidate slots, and all slots or some slots in the section $[n+T_1, n+T_2]$ may be candidate slots.

Here, with respect to the terminal 20 in which the above-described partial sensing is configured, details of an operation for a case of performing the reevaluation or preemption check has been unclear.

For example, in a case where the resource selection mechanism is used as is, new slots to be monitored are generated, and the power saving performance will be deteriorated.

Accordingly, candidate resource in the resource selection window in the reevaluation or the preemption check using the partial sensing may be determined as described in option 1) to option 3) below.

Option 1) The terminal 20 determines, as candidate resources, only preselected resources (r0, r1, r2, . . . ) and/or reserved resources (r0', r1', r2', . . . ).

Option 2) The terminal 20 determines, as candidate resources, resources that can be included in the $S_A$ considering the time requirements among the candidate resource set $S_A$ according to the initial resource selection procedure.

Option 3) The terminal 20 determines, as candidate resources, resources that can be included in the $S_A$ considering the time requirements among the candidate resource set $S_A$ according to the initial resource selection procedure and other resources. For example, some of or all of the resource selection window may be the candidate resource.

With respect to each of the above-described options, it is necessary to study a UE operation at the time of reevaluation or preemption for the resources that are to be reserved or that have been reserved according to aperiodic reservation.

In addition, there is a possibility that each of the above-described options is not required to be suitable for a UE operation at the time of reevaluation or preemption for the resources that are to be reserved or that have been reserved according to periodic reservation, and thus, discussions of an operation are required.

Figure 20:
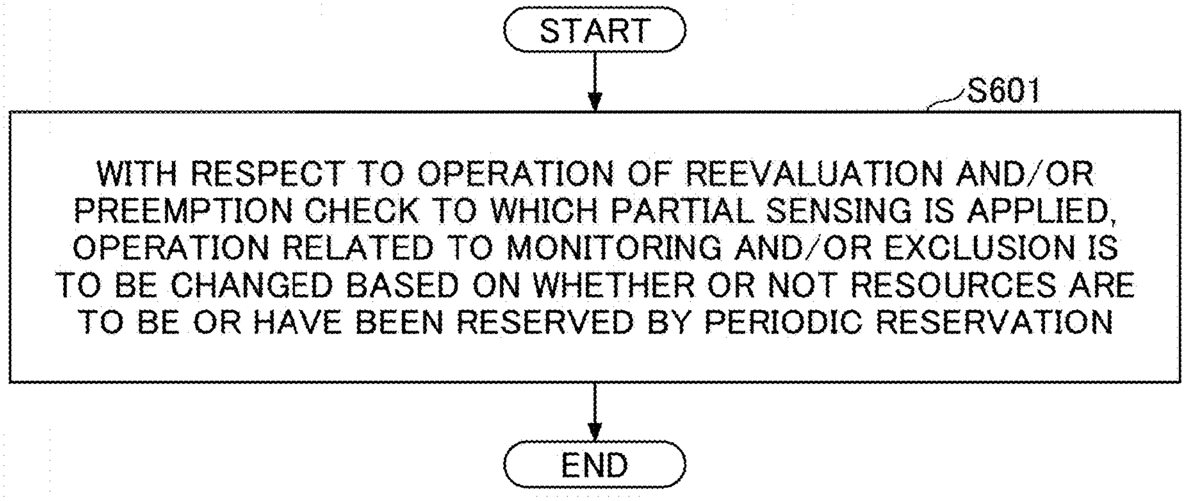
FIG. 20 is a flowchart for describing an example of resource selection in an embodiment of the present invention.

FIG. 20 is a flowchart for describing an example of resource selection in an embodiment of the present invention. In step S601, with respect to an operation of reevaluation and/or preemption check to which partial sensing is applied, an operation related to the monitoring and/or exclusion may be changed based on whether or not resources are to be reserved or have reserved by periodic reservation. Alternatively, the same operation may be applied.

For example, in a case where the target resources of the reevaluation or preemption check are not resources that have been reserved by the periodic reservation, in the above-described option 1), with respect to the RSRP threshold value, the terminal 20 may use the last RSRP threshold value in the initial resource selection procedure of an operation for selecting the resources, and in a case where reservation of another UE exceeding the RSRP threshold value is detected with respect to the resources, the terminal 20 may report to the upper layer that the resources cannot be used. In the above-described option 1), slots from the last slot ($n+T_B$) of the monitoring slots at the time of selecting the target resources to a slot ($m-T_{proc,0}^{SL}$) may be added as the CPS monitoring slots to the monitoring slots. It is to be noted that m is a slot for performing the reevaluation or preemption check, and $T_{proc,0}^{SL}$ is a terminal processing time.

The reevaluation or preemption check can be performed using an appropriate RSRP threshold value by performing an operation as described above.

For example, in a case where the target resources of the reevaluation or preemption check are not resources that have been reserved by the periodic reservation, in the above-described option 2), the terminal 20 may add slots from the last slot (n+TB) of the monitoring slots at the time of selecting the target resources to a slot ($m-T_{proc,0}^{SL}$) to the monitoring slots as the CPS monitoring slots. It is to be noted that m is a slot for performing the reevaluation or preemption check, and $T_{proc,0}^{SL}$ is a terminal processing time. An operation of reevaluation or preemption check that is defined in the 3GPP release 16 may be applied to the $S_A$ in the option 2). With respect to the above, in a case where the number of candidate resources remained in $S_A$ is less than the configured threshold value, the step 5a of initializing $S_A$ is not required to be performed (refer to Non-Patent Document 3). In addition, with respect to the RSRP threshold value, the last RSRP threshold value in the initial resource selection procedure of an operation for selecting the resources may be used, and in a case where the number of candidate resources remained in $S_A$ is less than the configured threshold value, the step 7 of increasing the RSRP threshold value and performing the resource exclusion again is not required to be performed (refer to Non-Patent Document 3).

According to the above-described operation, an operation related to increased collisions can be avoided while reusing the operations defined in the 3GPP release 16 as much as possible.

FIG. 2 is a drawing for describing an example of resource selection in an embodiment of the present invention. For example, in a case where the target resources of the reevaluation or preemption check are resources reserved by the periodic reservation, the terminal 20 may perform the resource identification and exclusion using the same method as the initial resource selection procedure. In other words, the $S_A$ may be newly determined based on the reevaluation or preemption check performing slot.

Figure 21:
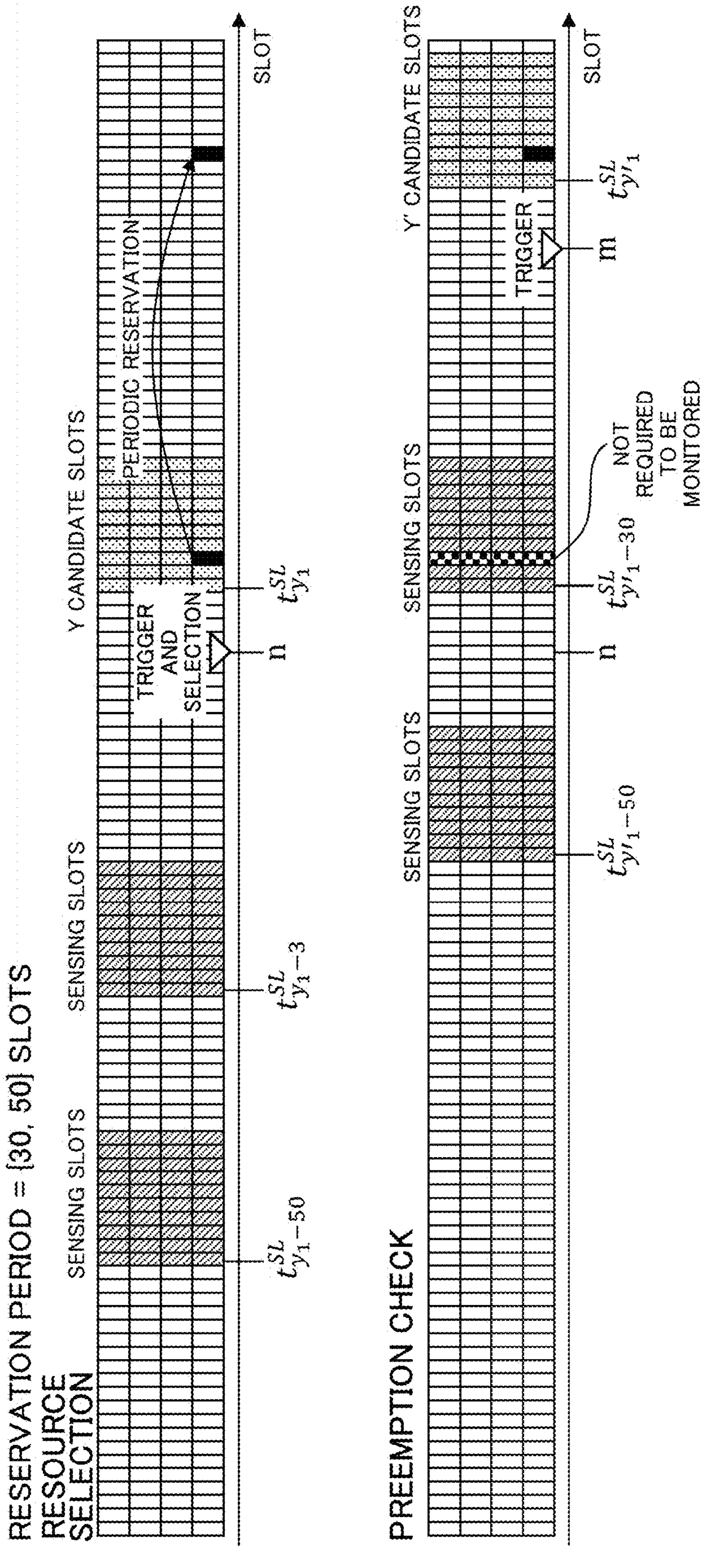
FIG. 21 is a drawing for describing an example of resource selection in an embodiment of the present invention.

With respect to the above, as illustrated in FIG. 21, one of monitoring slots determined based on PBPS is not required to be monitored by the terminal 20, and the selected candidate slot corresponding to the unmonitored slot is not required to be excluded from the selection candidate group. For example, monitoring cannot be performed in a slot in which a reservation signal is transmitted among the monitoring slots, and thus, monitoring of this slot is not required to be performed.

According to the above-described operation, an operation that is not suitable for the reevaluation or preemption check can be avoided while sharing the resource selection and operation.

The above embodiments may be applied to an operation in which one terminal 20 configures or allocates transmission resources of another terminal 20.

The above embodiments need not be limited to V2X terminals, but may be applied to terminals performing D2D communication.

The operation in the above embodiments may be performed only in a specific resource pool. For example, the operation may be performed only in the resource pool that is available for a terminal 20 of release 17 or later.

According to the above-described embodiment, the terminal 20 can appropriately perform the reevaluation or preemption in a case where partial sensing is applied, in accordance with a method by which the target resources are reserved.

In other words, the autonomous resource selection can be performed appropriately in the device-to-device direct communication.

(Device Configuration)

Next, a functional configuration example of the base station 10 and the terminal 20 for performing the processes and operations described above will be described. The base station 10 and the terminal 20 include functions for implementing the embodiments described above. It should be noted, however, that each of the base stations 10 and the terminal 20 may include only some of the functions in an embodiment.

<Base Station 10>

Figure 22:
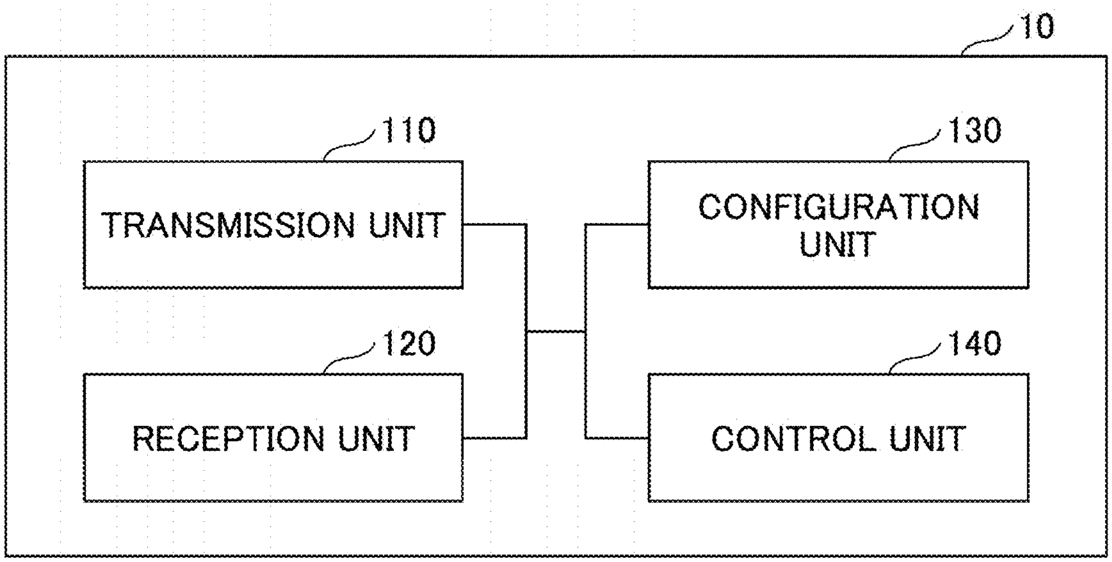
FIG. 22 is a drawing illustrating an example of a functional configuration of a base station 10 in an embodiment of the present invention.

FIG. 22 is a diagram illustrating an example of a functional configuration of the base station 10. As shown in FIG. 22, the base station 10 includes a transmission unit 110, a reception unit 120, a configuration unit 130, and a control unit 140. The functional configuration illustrated in FIG. 22 is merely an example. Functional divisions and names of functional units may be anything as long as operations according to an embodiment of the present invention can be performed.

The transmission unit 110 includes a function for generating a signal to be transmitted to the terminal 20 side and transmitting the signal wirelessly. The reception unit 120 includes a function for receiving various signals transmitted from the terminal 20 and acquiring, for example, information of a higher layer from the received signals. Further, the transmission unit 110 has a function to transmit NR-PSS, NR-SSS, NR-PBCH, DL/UL control signals, DL reference signals, and the like to the terminal 20.

The configuration unit 130 stores preset configuration information and various configuration information items to be transmitted to the terminal 20 in a storage apparatus and reads the preset configuration information from the storage apparatus as necessary. Contents of the configuration information are, for example, information related to configuration of D2D communication, etc.

As described in an embodiment, the control unit 140 performs processing related to the configuration in which the terminal 20 performs D2D communication. Further, the control unit 140 transmits scheduling of D2D communication and DL communication to the terminal 20 through the transmission unit 110. Further, the control unit 140 receives information related to the HARQ response of the D2D communication and the DL communication from the terminal 20 via the reception unit 120. The functional units related to signal transmission in the control unit 140 may be included in the transmission unit 110, and the functional units related to signal reception in the control unit 140 may be included in the reception unit 120.

<Terminal 20>

Figure 23:
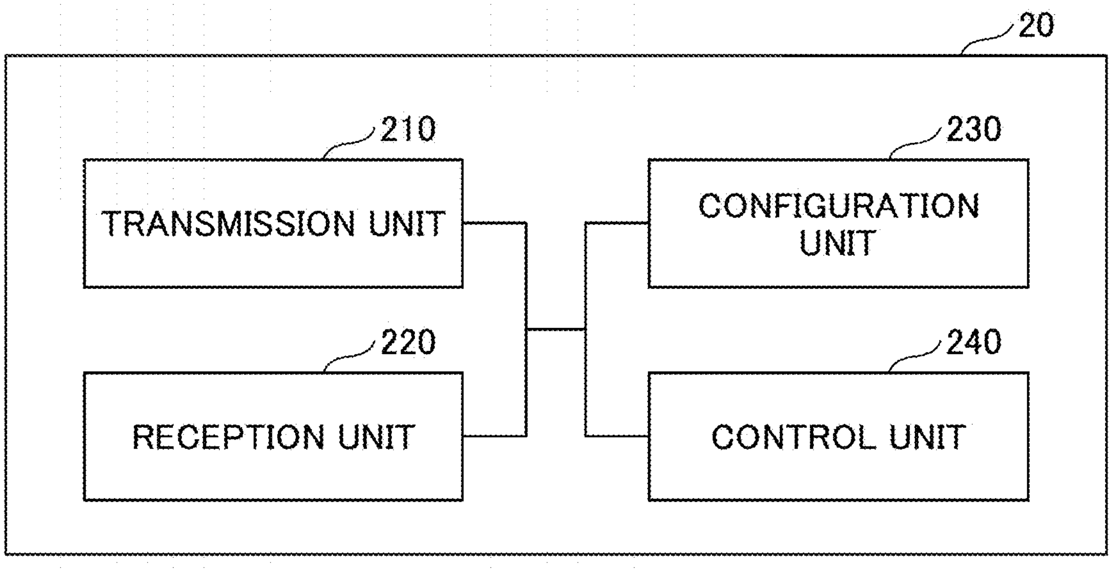
FIG. 23 is a drawing illustrating an example of a functional configuration of a terminal 20 in an embodiment of the present invention.

FIG. 23 is a diagram illustrating an example of a functional configuration of the terminal 20. As shown in FIG. 23, the terminal 20 includes a transmission unit 210, a reception unit 220, a configuration unit 230, and a control unit 240. The functional configuration illustrated in FIG. 23 is merely an example. Functional divisions and names of functional units may be anything as long as operations according to an embodiment of the present invention can be performed.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, or reference signals transmitted from the base station 10. Further, for example, with respect to the D2D communications, the transmission unit 210 transmits, to another terminal 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 220 receives, from the another terminal 20, PSCCH, PSSCH, PSDCH, or PSBCH.

The configuration unit 230 stores various configuration information received from the base station 10 or the terminal 20 by the reception unit 220 in the storage apparatus and reads them from the storage apparatus as necessary. In addition, the configuration unit 230 also stores pre-configured configuration information. Contents of the configuration information are, for example, information related to configuration of D2D communication, etc.

The control unit 240 controls D2D communication for establishing RRC connection with another terminal 20 as described in an embodiment of the present invention. Further, the control unit 240 performs processing related to the power-saving operation. Further, the control unit 240 performs HARQ related processing of the D2D communication and DL communication. Further, the control unit 240 transmits, to the base station 10, information related to the HARQ response of the D2D communication to the other terminal 20 and the DL communication scheduled by the base station 10. Further, the control unit 240 may perform scheduling of D2D communication for another terminal 20. In addition, the control unit 240 may autonomously select a resource to be used for D2D communication from the resource selection window, based on the sensing result, or may perform reevaluation or preemption. Further, the control unit 240 performs processing related to power saving in transmission and reception of D2D communications. In addition, the control unit 240 performs processing related to inter-terminal coordination in D2D communication. The functional units related to signal transmission in the control unit 240 may be included in the transmission unit 210, and the functional units related to signal reception in the control unit 240 may be included in the reception unit 220.

(Hardware Structure)

In the above block diagrams used for describing an embodiment of the present invention (FIG. 22 and FIG. 23), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 24:
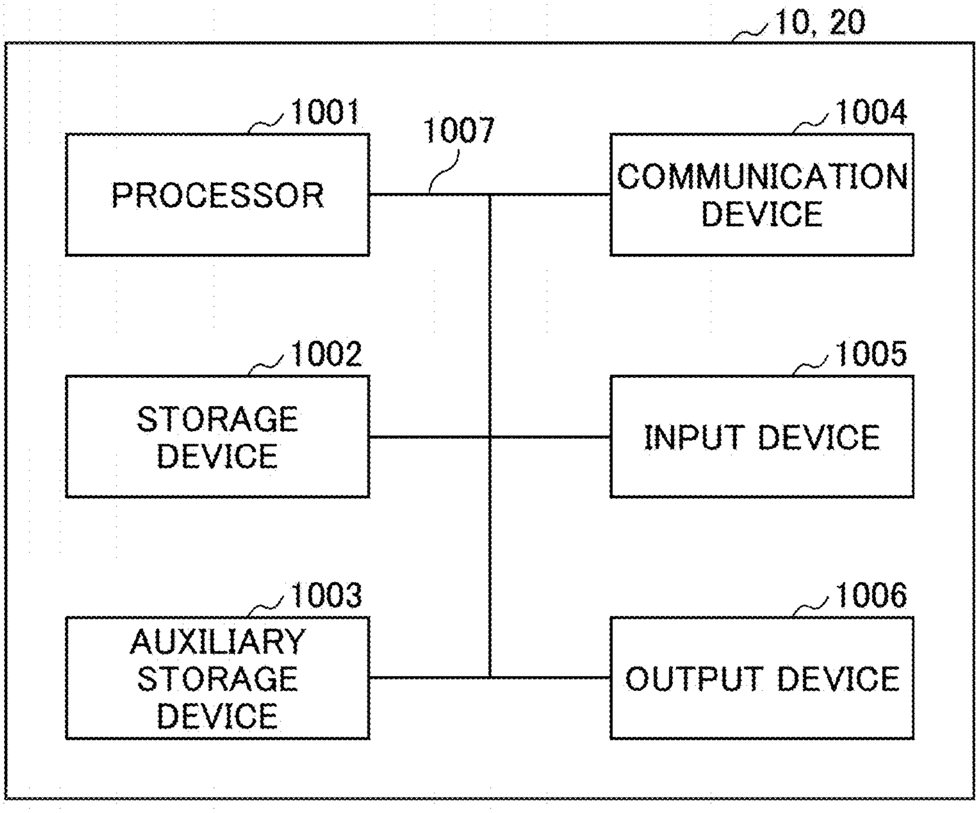
FIG. 24 is a drawing illustrating an example of a hardware structure of the base station 10 or the terminal 20 in an embodiment of the present invention.

For example, the base station 10, terminal 20, etc., according to an embodiment of the present disclosure may function as a computer for processing the radio communication method of the present disclosure. FIG. 24 is a drawing illustrating an example of hardware structures of the base station 10 and the terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and the terminal 20 may include one or more of each of the devices illustrated in the figure, or may be configured without including some of the devices.

Each function in the base station 10 and the terminal 20 is realized by having the processor 1001 perform an operation by reading predetermined software (programs) onto hardware such as the processor 1001 and the storage device 1002, and by controlling communication by the communication device 1004 and controlling at least one of reading or writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 22 may be realized by control programs that are stored in the storage device 1002 and are executed by the processor 1001. Further, for example, the control unit 240 of the terminal 20 illustrated in FIG. 23 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disc, digital versatile disc, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission or reception device) for communicating with computers via at least one of a wired network or a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) or a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Figure 25:
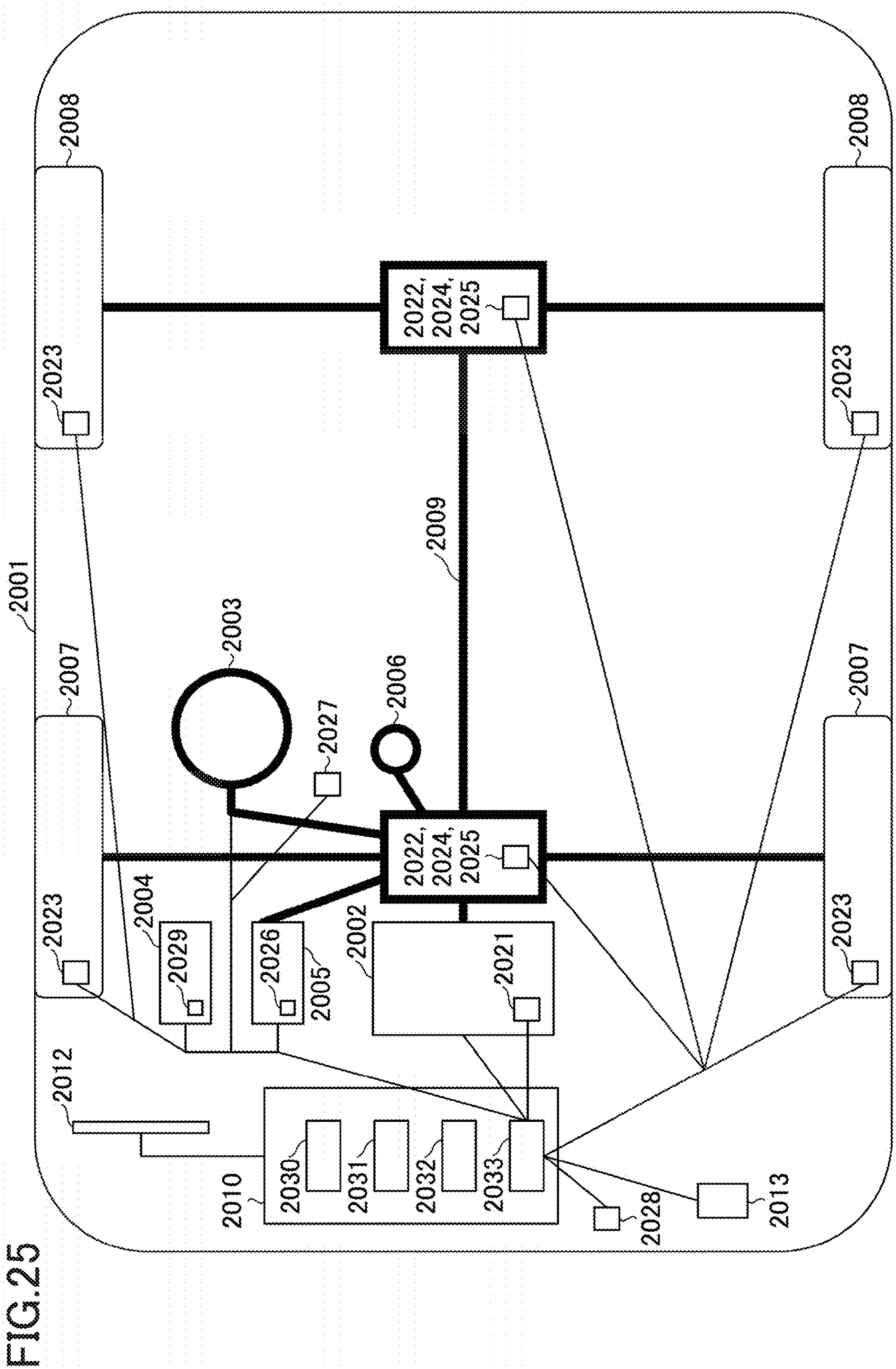
FIG. 25 is a drawing illustrating an example of a structure of a vehicle 2001 in an embodiment of the present invention.

FIG. 25 shows an example of a configuration of a vehicle 2001. As shown in FIG. 25, the vehicle 2001 includes a drive unit 2002, a steering unit 2003, an accelerator pedal 2004, a brake pedal 2005, a shift lever 2006, a front wheel 2007, a rear wheel 2008, an axle 2009, an electronic control unit 2010, various sensors 2021-2029, an information service unit 2012, and a communication module 2013. The aspects/embodiments described in the present disclosure may be applied to a communication device mounted in the vehicle 2001, and may be applied to, for example, the communication module 2013.

The drive unit 2002 may include, for example, an engine, a motor, and a hybrid of an engine and a motor. The steering unit 2003 includes at least a steering wheel and is configured to steer at least one of the front wheel or the rear wheel, based on the operation of the steering wheel operated by the user.

The electronic control unit 2010 includes a microprocessor 2031, a memory (ROM, RAM) 2032, and a communication port (IO port) 2033. The electronic control unit 2010 receives signals from the various sensors 2021-2029 provided in the vehicle 2001. The electronic control unit 2010 may be referred to as an ECU (Electronic control unit).

The signals from the various sensors 2021 to 2029 include a current signal from a current sensor 2021 which senses the current of the motor, a front or rear wheel rotation signal acquired by a revolution sensor 2022, a front or rear wheel pneumatic signal acquired by a pneumatic sensor 2023, a vehicle speed signal acquired by a vehicle speed sensor 2024, an acceleration signal acquired by an acceleration sensor 2025, a stepped-on accelerator pedal signal acquired by an accelerator pedal sensor 2029, a stepped-on brake pedal signal acquired by a brake pedal sensor 2026, an operation signal of a shift lever acquired by a shift lever sensor 2027, and a detection signal, acquired by an object detection sensor 2028, for detecting an obstacle, a vehicle, a pedestrian, and the like.

The information service unit 2012 includes various devices for providing various kinds of information such as driving information, traffic information, and entertainment information, including a car navigation system, an audio system, a speaker, a television, and a radio, and one or more ECUs controlling these devices. The information service unit 2012 provides various types of multimedia information and multimedia services to the occupants of the vehicle 2001 by using information obtained from the external device through the communication module 2013 or the like.

A driving support system unit 2030 includes: various devices for providing functions of preventing accidents and reducing driver's operating loads such as a millimeter wave radar, a LiDAR (Light Detection and Ranging), a camera, a positioning locator (e.g., GNSS, etc.), map information (e.g., high definition (HD) map, autonomous vehicle (AV) map, etc.), a gyro system (e.g., IMU (Inertial Measurement Unit), INS (Inertial Navigation System), etc.), an AI (Artificial Intelligence) chip, an AI processor; and one or more ECUs controlling these devices. In addition, the driving support system unit 2030 transmits and receives various types of information via the communication module 2013 to realize a driving support function or an autonomous driving function.

The communication module 2013 may communicate with the microprocessor 2031 and components of the vehicle 2001 via a communication port. For example, the communication module 2013 transmits and receives data via a communication port 2033, to and from the drive unit 2002, the steering unit 2003, the accelerator pedal 2004, the brake pedal 2005, the shift lever 2006, the front wheel 2007, the rear wheel 2008, the axle 2009, the microprocessor 2031 and the memory (ROM, RAM) 2032 in the electronic control unit 2010, and sensors 2021 to 2029 provided in the vehicle 2001.

The communication module 2013 is a communication device that can be controlled by the microprocessor 2031 of the electronic control unit 2010 and that is capable of communicating with external devices. For example, various kinds of information are transmitted to and received from external devices through radio communication. The communication module 2013 may be internal to or external to the electronic control unit 2010. The external devices may include, for example, a base station, a mobile station, or the like.

The communication module 2013 transmits a current signal, which is input to the electronic control unit 2010 from the current sensor, to the external devices through radio communication. In addition, the communication module 2013 also transmits, to the external devices through radio communication, the front or rear wheel rotation signal acquired by the revolution sensor 2022, the front or rear wheel pneumatic signal acquired by the pneumatic sensor 2023, the vehicle speed signal acquired by the vehicle speed sensor 2024, the acceleration signal acquired by the acceleration sensor 2025, the stepped-on accelerator pedal signal acquired by the accelerator pedal sensor 2029, the stepped-on brake pedal signal acquired by the brake pedal sensor 2026, the operation signal of the shift lever acquired by the shift lever sensor 2027, and the detection signal, acquired by the object detection sensor 2028, for detecting an obstacle, a vehicle, a pedestrian, and the like, that are input to the electronic control unit 2010.

The communication module 2013 receives various types of information (traffic information, signal information, inter-vehicle information, etc.) transmitted from the external devices and displays the received information on the information service unit 2012 provided in the vehicle 2001. In addition, the communication module 2013 stores the various types of information received from the external devices in the memory 2032 available to the microprocessor 2031. Based on the information stored in the memory 2032, the microprocessor 2031 may control the drive unit 2002, the steering unit 2003, the accelerator pedal 2004, the brake pedal 2005, the shift lever 2006, the front wheel 2007, the rear wheel 2008, the axle 2009, the sensors 2021-2029, etc., mounted in the vehicle 2001.

Embodiment Summary

As described above, according to an embodiment of the present invention, a terminal is provided. The terminal includes: a reception unit configured to receive a signal from another terminal in a resource pool for which a partial sensing is configured; a control unit configured to determine a first resource of a sensing target, and determine an available resource set by identifying candidate resources based on a sensing result of the first resource according to the reception unit; and a transmission unit configured to select a second resource used for transmission from the resource set, and transmit a signal using the second resource. The control unit determines a procedure of performing reevaluation or preemption check, based on whether the second resource is a resource reserved by periodic reservation.

According to the above-described configuration, the terminal 20 can appropriately perform the reevaluation or preemption in a case where partial sensing is applied, according to a method by which the target resources are reserved. In other words, the autonomous resource selection can be performed appropriately in the device-to-device direct communication.

In a case where the second resource is a resource reserved by periodic reservation, the control unit may perform reevaluation or preemption check with respect to either preselected resources, reserved resources, or both. According to the above-described configuration, the terminal 20 can appropriately perform the reevaluation or preemption in a case where partial sensing is applied, according to a method by which the target resources are reserved.

With respect to an RSRP (Reference Signal Received Power) threshold value to be applied to resource exclusion at the time of the reevaluation or the preemption check, the control unit may use a last RSRP threshold value in a resource selection procedure at a time of selecting target resources for the reevaluation or the preemption check. According to the above-described configuration, the terminal 20 can appropriately perform the reevaluation or preemption in a case where partial sensing is applied, according to a method by which the target resources are reserved.

In a case where the second resource is a resource reserved by periodic reservation, the control unit may perform reevaluation or preemption check with respect to resource candidates that can be included considering time requirements from among resource candidates in a resource selection procedure at a time of selecting target resources for the reevaluation or preemption check. According to the above-described configuration, the terminal 20 can appropriately perform the reevaluation or preemption in a case where partial sensing is applied, according to a method by which the target resources are reserved.

With respect to slots to be monitored at a time of the reevaluation or the preemption check, the control unit may determine, as monitoring targets, slots: from a last slot of slots that have been monitored in the resource selection procedure at the time of selecting the target resources for the reevaluation or the preemption check; to a slot that precedes a slot for performing the reevaluation or the preemption by a processing time. According to the above-described configuration, the terminal 20 can appropriately perform the reevaluation or preemption in a case where partial sensing is applied, according to a method by which the target resources are reserved.

In addition, according to an embodiment of the present invention, a communication method performed by a terminal is provided. The communication method includes: receiving a signal from another terminal in a resource pool for which a partial sensing is configured; determining a first resource of a sensing target, and determining an available resource set by identifying candidate resources based on a sensing result of the first resource according to the reception unit; selecting a second resource used for transmission from the resource set, and transmitting a signal using the second resource; and determining a procedure of performing reevaluation or preemption check, based on whether the second resource is a resource reserved by periodic reservation.

According to the above-described configuration, the terminal 20 can appropriately perform the reevaluation or preemption in a case where partial sensing is applied, according to a method by which the target resources are reserved. In other words, the autonomous resource selection can be performed appropriately in the device-to-device direct communication.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information indication may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block)), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), 6th generation mobile communication system (6G), xth generation mobile communication system (xG) (xG (x is, for example, an integer or a decimal)), FRA (Future Radio Access), NR (new Radio), New radio access (NX), Future generation radio access (FX), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced, modified, developed, or defined therefrom. Further, multiple systems may also be applied in combination (e.g., at least one of LTE or LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) or wireless technologies (infrared, microwave, etc.), at least one of these wired line technologies or wireless technologies is included within the definition of the transmission medium.

Information, a signal, or the like, described in the present specification may be represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station or that base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station or the mobile station may be referred to as a transmission apparatus, reception apparatus, communication apparatus, or the like. The at least one of the base station or the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station or the mobile station may include an apparatus that does not necessarily move during communication operations. For example, at least one of the base station or the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The terms "determination" and "decision" may include "determination" and "decision" made with judging, calculating, computing, processing, deriving, investigating, searching (looking up, search, inquiry) (e.g., search in a table, a database, or another data structure), or ascertaining. Further, the "determining" may include "determining" made with receiving (e.g., receiving information), transmitting (e.g., transmitting information), inputting, outputting, or accessing (e.g., accessing data in a memory). Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, or printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "based on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts", "circuits", "devices", etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission or reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, or specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe or the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.) may be replaced with a TTI having a time length exceeding 1 ms, and the short TTI (e.g., shortened TTI, etc.) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), sub-carrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a terminal 20, one or more BWPs may be configured in one carrier.

At least one of the configured BWPs may be activated, and the terminal 20 may assume that the terminal 20 will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in an RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

Each aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device
2001 Vehicle
2002 Drive unit
2003 Steering unit
2004 Accelerator pedal
2005 Brake pedal
2006 Shift lever
2007 Front wheel
2008 Rear wheel
2009 Axle
2010 Electronic control unit
2012 Information service unit
2013 Communication module
2021 Current sensor
2022 Revolution sensor
2023 Pneumatic sensor
2024 Vehicle speed sensor
2025 Acceleration sensor
2026 Brake pedal sensor
2027 Shift lever sensor
2028 Object detection sensor
2029 Accelerator pedal sensor
2030 Driving support system unit
2031 Microprocessor
2032 Memory (ROM, RAM)
2033 Communication port (IO port)

The invention claimed is:

1. A terminal comprising:

a processor configured to, when reevaluation or preemption checking of a resource for transmission of a signal for device-to-device communication is triggered, change an operation related to partial sensing based on whether or not the resource for transmission is reserved by a periodic reservation; and a transmitter configured to, when the reevaluation or the preemption checking is determined to be performed based on a candidate resource set that is determined based on a result of the changed partial sensing, transmit a signal for the device-to-device communication by using a resource that is selected from the candidate resource set, wherein, when the resource for transmission subject to reevaluation or preemption checking is not reserved by the periodic reservation, the processor adds slots that are located after execution slots of the contiguous partial sensing (CPS) for selecting the resource for transmission that is subject to the reevaluation or the preemption checking as slots to be used for the CPS when the reevaluation or the preemption checking is triggered.

2. The terminal as claimed in claim 1, wherein when the resource for transmission is not a resource that is reserved by the periodic reservation, the processor determines slots to be used for CPS based on a slot in which the reevaluation or the preemption checking is triggered.

3. A communication method performed by a terminal, the communication method comprising:

when reevaluation or preemption checking of a resource for transmission of a signal for device-to-device communication is triggered, changing an operation related to partial sensing based on whether or not the resource for transmission is reserved by a periodic reservation;

when the reevaluation or the preemption checking is determined to be performed based on a candidate resource set that is determined based on a result of the changed partial sensing, transmitting a signal for the device-to-device communication by using a resource that is selected from the candidate resource set; and when the resource for transmission subject to reevaluation or preemption checking is not reserved by the periodic reservation, adding slots that are located after execution slots of the contiguous partial sensing (CPS) for selecting the resource for transmission that is subject to the reevaluation or the preemption checking as slots to be used for the CPS when the reevaluation or the preemption checking is triggered.

* * * * *